US010563914B2

(12) United States Patent
Guillard et al.

(10) Patent No.: US 10,563,914 B2
(45) Date of Patent: Feb. 18, 2020

(54) METHODS AND SYSTEMS FOR INTEGRATION OF INDUSTRIAL SITE EFFICIENCY LOSSES TO PRODUCE LNG AND/OR LIN

(71) Applicant: L'Air Liquide, Societe Anonyme pour l'Etude et l'Exploitation des Procedes Georges Claude, Paris (FR)

(72) Inventors: Alain Guillard, Houston, TX (US); Michael A. Turney, Houston, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 672 days.

(21) Appl. No.: 15/229,843

(22) Filed: Aug. 5, 2016

(65) Prior Publication Data

US 2017/0038132 A1   Feb. 9, 2017

Related U.S. Application Data

(60) Provisional application No. 62/370,953, filed on Aug. 4, 2016, provisional application No. 62/305,381, filed
(Continued)

(51) Int. Cl.
*G06Q 50/06* (2012.01)
*G06Q 10/06* (2012.01)
(Continued)

(52) U.S. Cl.
CPC .......... *F25J 1/0022* (2013.01); *F25J 1/0015* (2013.01); *F25J 1/0045* (2013.01); *F25J 1/0052* (2013.01);
(Continued)

(58) Field of Classification Search
None
See application file for complete search history.

(56) References Cited

U.S. PATENT DOCUMENTS

| 3,616,652 A | 11/1971 | Engel |
| 3,792,590 A | 2/1974 | Lofred et al. |

(Continued)

FOREIGN PATENT DOCUMENTS

CN   204 063 780   12/2014

OTHER PUBLICATIONS

International Search Report and Written Opinion for PCT/US2016/045811, dated Jan. 12, 2017.

*Primary Examiner* — Patricia H Munson
*Assistant Examiner* — Crystol Stewart
(74) *Attorney, Agent, or Firm* — Justin K. Murray

(57) ABSTRACT

A method includes receiving input corresponding to a proposed configuration of a liquefaction facility and identifying a plurality of components utilized to produce LNG and/or LIN at the facility. The method includes determining an alternative configuration that is different from the proposed configuration. Determining the alternative configuration may include identifying resources accessible to a proposed location for the liquefaction facility and whether at least one of the resources accessible to the proposed location corresponds to a resource generated by a component identified by the proposed configuration, and determining whether to omit at least one component of the plurality of components identified by the proposed configuration. The method includes omitting the at least one component from the alternative configuration, and generating a report based on the proposed configuration and the alternative configuration.

(Continued)

The report includes information indicating a difference between the proposed configuration and the alternative configuration.

32 Claims, 7 Drawing Sheets

Related U.S. Application Data on Mar. 8, 2016, provisional application No. 62/201,947, filed on Aug. 6, 2015.

(51) Int. Cl.
*G06Q 50/00* (2012.01)
*F25J 1/00* (2006.01)
*F25J 1/02* (2006.01)
*F25J 3/02* (2006.01)
*F25J 3/04* (2006.01)

(52) U.S. Cl.
CPC ......... *F25J 1/0072* (2013.01); *F25J 1/0092* (2013.01); *F25J 1/0202* (2013.01); *F25J 1/0208* (2013.01); *F25J 1/0238* (2013.01); *F25J 1/0275* (2013.01); *F25J 1/0292* (2013.01); *F25J 3/0257* (2013.01); *F25J 3/04412* (2013.01); *G06Q 10/0637* (2013.01); *G06Q 50/06* (2013.01); *F25J 2205/02* (2013.01); *F25J 2205/04* (2013.01); *F25J 2210/06* (2013.01); *F25J 2210/40* (2013.01); *F25J 2210/60* (2013.01); *F25J 2215/42* (2013.01); *F25J 2220/02* (2013.01); *F25J 2220/44* (2013.01); *F25J 2220/60* (2013.01); *F25J 2220/64* (2013.01); *F25J 2220/66* (2013.01); *F25J 2220/68* (2013.01); *F25J 2230/22* (2013.01); *F25J 2230/42* (2013.01); *F25J 2230/60* (2013.01); *F25J 2240/02* (2013.01); *F25J 2240/12* (2013.01); *F25J 2240/40* (2013.01); *F25J 2240/44* (2013.01); *F25J 2245/02* (2013.01); *F25J 2245/42* (2013.01); *F25J 2270/08* (2013.01); *F25J 2270/42* (2013.01); *F25J 2270/88* (2013.01); *F25J 2290/12* (2013.01); *F25J 2290/34* (2013.01); *F25J 2290/70* (2013.01); *G06Q 50/00* (2013.01)

(56) References Cited

U.S. PATENT DOCUMENTS

| | | | | |
|---|---|---|---|---|
| 5,732,192 | A * | 3/1998 | Malin | G06F 17/5036 703/2 |
| 5,755,114 | A | 5/1998 | Foglietta | |
| 6,002,985 | A * | 12/1999 | Stephenson | E21B 43/00 702/13 |
| 6,085,545 | A | 7/2000 | Johnston | |
| 6,102,958 | A * | 8/2000 | Meystel | G06F 17/10 700/286 |
| 6,131,407 | A | 10/2000 | Wissolik | |
| 6,196,021 | B1 | 3/2001 | Wissolik | |
| 6,389,844 | B1 * | 5/2002 | Klein Nagel Voort | F25J 1/0214 62/612 |
| 6,412,302 | B1 | 7/2002 | Foglietta | |
| 6,519,531 | B1 * | 2/2003 | Batycky | G01V 9/02 702/12 |
| 6,694,774 | B1 | 2/2004 | Rashad et al. | |
| 6,980,940 | B1 * | 12/2005 | Gurpinar | E21B 43/00 703/10 |
| 7,134,296 | B2 | 11/2006 | Howard | |
| 2003/0167265 | A1 * | 9/2003 | Corynen | G06Q 10/04 |
| 2004/0118153 | A1 * | 6/2004 | Sawchuk | C10L 3/10 62/613 |
| 2004/0122640 | A1 * | 6/2004 | Dusterhoft | E21B 49/006 703/10 |
| 2005/0171746 | A1 * | 8/2005 | Thalhammer-Reyero | G05B 17/02 703/2 |
| 2006/0075776 | A1 | 4/2006 | Howard | |
| 2006/0180231 | A1 * | 8/2006 | Harland | B63B 22/026 141/1 |
| 2007/0193303 | A1 * | 8/2007 | Hawrysz | F25J 1/0242 62/612 |
| 2010/0332442 | A1 * | 12/2010 | Goel | G06Q 10/06 706/52 |
| 2011/0238392 | A1 * | 9/2011 | Carvallo | E21B 43/00 703/2 |
| 2011/0288895 | A1 * | 11/2011 | Perez, Jr. | G06Q 10/06 705/7.12 |
| 2011/0295772 | A1 * | 12/2011 | Pawlik | G06Q 10/06 705/500 |
| 2011/0307290 | A1 * | 12/2011 | Rolia | G06Q 10/06 705/7.25 |
| 2011/0307412 | A1 * | 12/2011 | Rolia | G06Q 10/06 705/348 |
| 2012/0053975 | A1 * | 3/2012 | Lohn, Jr. | G06Q 10/0631 705/7.12 |
| 2012/0083914 | A1 * | 4/2012 | Kocis | G05B 17/02 700/100 |
| 2012/0084106 | A1 * | 4/2012 | Pathak | G06Q 10/00 705/7.11 |
| 2013/0036763 | A1 * | 2/2013 | Vist | F25J 1/0022 62/611 |
| 2013/0275175 | A1 * | 10/2013 | Esmaili | G06Q 10/063 705/7.23 |
| 2014/0053599 | A1 * | 2/2014 | Byfield | F28B 1/06 62/611 |
| 2014/0316839 | A1 * | 10/2014 | Furman | G06Q 10/06 705/7.24 |
| 2014/0344000 | A1 * | 11/2014 | Furman | G06Q 10/06 705/7.23 |
| 2014/0352353 | A1 | 12/2014 | Wissolik | |
| 2015/0168057 | A1 | 6/2015 | Musicus | |
| 2015/0168058 | A1 | 6/2015 | Musicus | |
| 2015/0176765 | A1 * | 6/2015 | Faka | F17C 1/002 62/50.1 |
| 2016/0063414 | A1 * | 3/2016 | Guillard | G06Q 10/06313 705/7.23 |

* cited by examiner

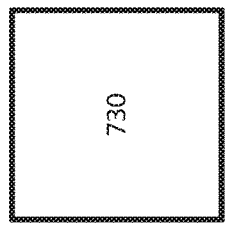
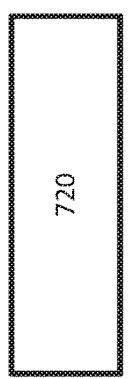
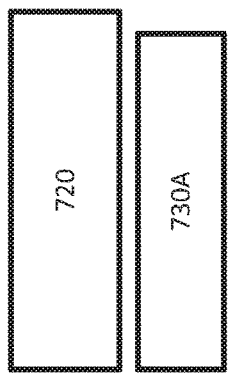
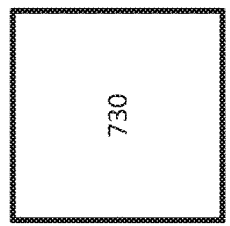
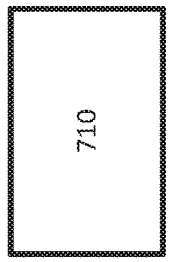
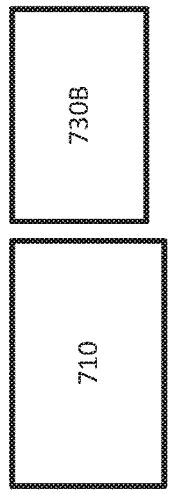
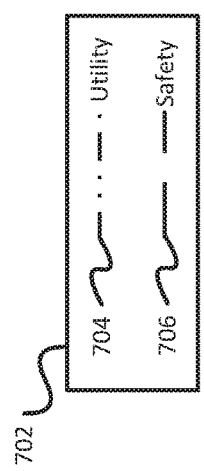
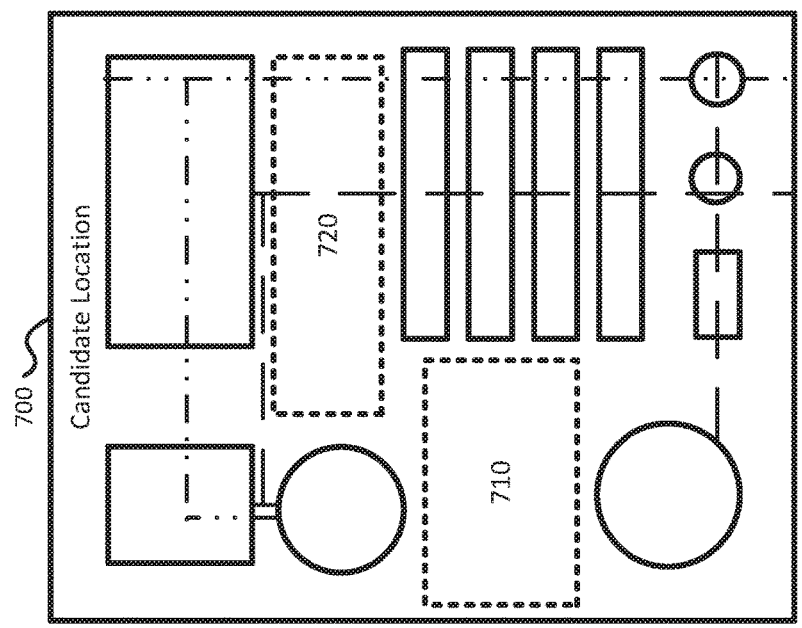

METHODS AND SYSTEMS FOR INTEGRATION OF INDUSTRIAL SITE EFFICIENCY LOSSES TO PRODUCE LNG AND/OR LIN

CLAIM OF PRIORITY

The present application claims the benefit of U.S. Provisional Application Ser. No. 62/201,947, filed on Aug. 6, 2015, and U.S. Provisional Patent Application No. 62/305, 381, filed on Mar. 8, 2016, and U.S. Provisional Patent Application No. 62/370,953, filed on Aug. 4, 2015, the contents of which are expressly incorporated herein by reference in their entireties.

TECHNICAL FIELD

The present disclosure generally relates to determining a configuration of a liquefied natural gas and/or liquid nitrogen production facility, and, in particular, determining a recommended configuration and/or location for constructing a liquefied natural gas production facility.

BACKGROUND OF THE INVENTION

Traditionally natural gas is compressed and sent down pipelines under high pressure to transport the gas to market. When the gas has arrived at its use point, the pressure of the natural gas is reduced in one or more control valves to its final pressure for consumption. The available energy from the reduction in pressure of the natural gas is wasted in the control valves as well as any chilling effect (also known as the Thompson effect) caused by the flow of natural gas through these devices.

In the past, advantage has been taken of this wasted energy by facilities utilizing the energy and refrigeration effect of expanding the natural gas. One such facility was designed and constructed by Airco Industrial Gases' Cryoplants Division in the early 1970's in Reading, Pa. for UGI Corporation. It employed a natural gas pressure reduction station ("Letdown Station") to make liquefied natural gas ("LNG") or liquid nitrogen ("LIN"). A majority of the natural gas entering the plant under high pressure from the transportation pipeline was cooled and sent to an expansion turbine where energy and refrigeration were generated. The remainder of the stream was subsequently cooled with the refrigeration and a portion liquefied. The liquefied portion was then passed to a storage tank as LNG product. The natural gas that was not liquefied was warmed, collected and sent to the low pressure main at a lower pressure than the high-pressure main.

U.S. Pat. No. 6,196,021 describes a system that uses natural gas expansion to provide refrigeration to liquefy a natural gas stream which is then revaporized by heat exchange with a nitrogen stream to cool the nitrogen stream. This refrigeration supplements refrigeration provided by nitrogen pressure letdown and a nitrogen cycle to provide liquid nitrogen. Similarly, U.S. Pat. No. 6,131,407 describes a system that produces LIN to be sent directly to an air separation unit ("ASU") to assist refrigeration of the ASU. U.S. Patent Application Publication No. 2014/352353 describes a similar system to the system of disclosed by U.S. Pat. No. 6,131,407, but adds that the LIN produced can be sent to a tank instead of directly to the ASU. In each of these system, LNG is revaporized to provide for nitrogen cooling. However, it is not desirable to liquefy and then revaporize the natural gas, as this is thermally inefficient. U.S. Pat. No. 6,694,774 describes a system that uses natural gas letdown to provide refrigeration to produce a liquefied natural gas stream, where the refrigeration is supplemented by a closed loop mixed refrigerant cycle.

BRIEF SUMMARY OF THE INVENTION

Nitrogen is transported through high pressure pipelines because of the lower transport cost of reduced volumetric flows associated with high pressure gas. Typically such pipelines operate in the range of 30 to 50 bar. Customers using nitrogen from a pipeline often do not need the nitrogen at these pressures. For example, nitrogen is typically used as an inert utility fluid at pressures in range of 3 to 8 bar. As such, in these locations, potential refrigeration capacity is wasted. Additionally, there are instances in which producers of the nitrogen gas feeding the pipeline must not operate at 100% of equipment design capacity, and therefore, large nitrogen compressors are not operating or not operating at optimum capacity. This can occur if the demand for nitrogen is lower than originally anticipated, for example. One reason this occurs is because the nitrogen producing equipment is sized to meet peak customer demand under peak operating scenarios, ambient conditions, catalyst life, and the like. As such, the nitrogen producing equipment may be designed to be underutilized during many operating scenarios when other systems are not able to accommodate increased loads, such as when demand for nitrogen by systems of customers served by the nitrogen producing equipment is lower than the peak nitrogen production capabilities of the nitrogen producing equipment.

In certain embodiments of the invention, a process can provide for zero energy LNG and/or LIN production with zero energy input, very reduced energy input, or at least reduced energy input by using the refrigeration capabilities of letdown of natural gas and let down of nitrogen or a gas rich in nitrogen. An example of a gas rich in nitrogen is a lean synthetic air stream with less than 12% $O_2$ (e.g., due to the limit of combustion for a mixture with methane). In embodiments, the letdown process occurs at a location that is proximate to an existing facility or location where the letdown of both natural gas and nitrogen occurs to serve the needs of the facility, such that LNG and/or LIN can be produced with reduced operating costs and/or capital costs as compared to a situation without the benefit of the letdown of a gas stream (e.g., a nitrogen stream, a stream of gas rich in nitrogen, or a natural gas or other high pressure gas stream at a production site).

Nitrogen is typically a byproduct of an air separation unit ("ASU") which is typically designed to produce oxygen ($O_2$). When customer demand for nitrogen is high, nitrogen produced as a byproduct of an ASU may be compressed and delivered to a pipeline that transports the nitrogen to the customer. When customer demand for nitrogen is low, it is vented from the ASU at low pressure or may be used internally to help cool an air stream. In another embodiment, a nitrogen production facility located at a different location than the location of the natural gas letdown facility is identified as having the ability to divert nitrogen production capacity (i.e., the nitrogen compression equipment is at least periodically underutilized locally). This nitrogen compression equipment can then be switched to operate at a higher capacity, for example, its maximum or design capacity, with the excess nitrogen being introduced to a nearby nitrogen pipeline. The aforementioned natural gas letdown facility is preferably located at a second point nearby the same nitrogen pipeline, and the excess nitrogen introduced to the nitrogen pipeline may be utilized to produce LNG and/or LIN.

In another embodiment, energy can be provided by a combination of under-utilized letdown of nitrogen (or a nitrogen rich gas stream) and natural gas (and/or another industrial gas) to existing users and under-utilized compression/pipeline equipment.

In another embodiment, a method is provided for providing LNG and/or LIN production capacity with minimal operating expenses by identifying synergistic locations. In one embodiment, the method can include the step of collating data which can include operating conditions and locations for existing natural gas pressure letdown facilities, gaseous nitrogen letdown facilities, and/or another industrial gas, underutilized capacity of gaseous nitrogen compression equipment, and current and/or future LNG and/or LIN demand locations. From this data, synergistic locations can be identified. Calculations can then be made based on the identified location using the appropriate data to determine a proposed configuration, and a report can be generated outlining various identified synergistic locations, along with their proposed configurations, and in a preferred embodiment, associated capital expenditure costs and operating costs based on stored historical data.

In another embodiment, the invention can also include various locations within a specific site for location of the new LNG and/or LIN production facility, as well as identification of proposed new pipe routes and tie-ins.

In one embodiment, the invention can be configured such that a user initially selects a geographical location, for example, a specific point, industrial site, or within a defined area, or along a defined path (e.g., a location within a specified distance of a length of an identified pipeline or river). From this selection of geographical location, the system can then access the database and select a proposed configuration for a liquefaction facility (e.g., a facility that produces LNG and/or LIN) that is suitable for the geographical location.

In another embodiment, the invention can be configured such that a user initially selects a proposed configuration and the system then accesses the database to determine a suitable geographical location(s) for the liquefaction facility.

Many of the nitrogen consumers on pipelines do not need the high pressure that the pipeline delivers (e.g., 30 to 50 bara), and the vast majority consume nitrogen at pressures less than 8 bara. Additionally, periodic utilization of existing nitrogen availability installed on these networks may be in the range of 60% to 90%, so there is potential for "free" compression (i.e., there are no capital expenditure costs associated with purchasing compressors to product the LNG and/or the LIN).

In certain embodiments of the invention, it is preferred to generate LNG and/or LIN with little to no energy usage by taking advantage of the excess pressures between the pipeline pressure and the user pressures for one or more streams (e.g., a natural gas stream, a nitrogen stream, a nitrogen rich stream, and/or other industrial gas streams).

In another embodiment, double point locations can be identified. Double point locations are those locations that are located within a short distance to both a natural gas letdown station or equivalent and a nitrogen pipeline, where the number of points for at the location represents the number of points where letdown of a gaseous stream occurs. For example, in this case, capacity in the nitrogen pipeline can be utilized by expanding to low pressure and venting. Thus, a first point of the double point location may correspond to the letdown of the natural gas, and the second point of the double point location may correspond to the letdown of the nitrogen which is made available by underutilized nitrogen compression equipment and which may be in another location. Simulations indicate that a 10% to 20% savings in terms of total liquefaction cost (including operational expenses (OPEX) and capital expenditures (CAPEX)) per unit of LNG compared to a conventional LNG cycle can be achieved. Additionally, liquefaction facilities according to embodiments may realize significantly improved environmental emissions compared to typical LNG production facilities. This is because the OPEX power input is reduced compared to typical a LNG production facility.

In another embodiment, triple point locations can be identified. Triple point locations are those locations wherein, in addition to the double point location described above, a natural gas let down station is located near an existing or future letdown valve of a medium or low pressure gas customer. For example, in this case, in addition to the natural gas and nitrogen letdown described above, the medium or low pressure customer may be taking the gas at a lower pressure than is supplied by the pipeline such that the expansion energy can be utilized to produce refrigeration. In one embodiment, LIN may also be coproduced if desired.

Another type of triple point location contains the natural gas letdown near a nitrogen pipeline where underutilized nitrogen can be expanded to low pressure and vented as well as being near an industrial site where another high pressure gas is reduced in pressure to a medium pressure user.

In another embodiment, quadruple point locations can be identified. Quadruple point locations are those wherein a natural gas letdown station is located near an existing letdown valve of a medium pressure nitrogen customer, utilizing the capacity in the nearby pipeline expanding to low pressure vent to atmosphere, as well as being near an industrial site where another high pressure gas is reduced in pressure to a medium pressure customer or vented to the atmosphere. In this case approximately 20 to 40% savings in terms of cost per unit of LNG compared to conventional LNG cycle can be achieved with a further reduction in environmental emissions.

Systems, methods, apparatuses, and computer-readable storage devices for determining a recommended configuration for constructing a liquefaction facility are disclosed. Determining the recommended configuration for constructing the liquefaction facility may include determining whether to construct the liquefaction facility with a plurality of components (e.g., a refrigeration compressor, and the like) that produce resources (e.g., NG, LNG, LIN, GAN, etc.) utilized during operation of a traditional liquefaction facility, or whether to construct the liquefaction facility without one or more of the plurality of components by utilizing availability of existing systems at the site, such as utilizing letdown energy to provide refrigeration. The table below provides examples of such components, and highlights several advantages and/or differences of liquefaction facilities configured according to embodiments of the present disclosure. In particular, the table below indicates that constructing a liquefaction facility according to embodiments of the present disclosure reduces capital expenditures ("CAPEX") associated with constructing a liquefaction facility, and also reduces operational expenses ("OPEX") associated with operating the liquefaction facility.

| Components conventionally provided at a liquefaction facility for producing LNG | Comparison of components at a multipoint liquefied gas production facility according to embodiments |
|---|---|
| Natural gas supply cost-conventional liquefaction facilities incur operational expenses associated with acquiring natural gas that is then used to produce LNG. | Natural gas supply cost-In a liquefaction facility according to embodiments, the costs for acquiring natural gas used to produce LNG (or another type of liquefied gas) is reduced due to integration of the liquefaction facility with larger supply contract (e.g., the per unit cost of the natural gas supply is lower because of higher volume of consumption caused by placing the liquefaction facility at a location where an industrial facility utilizes letdown natural gas-the natural gas supply is consumed by both the liquefaction facility and the industrial facility), such that the supply contract may be many times larger than that of the LNG plant alone. This may reduce the OPEX associated with operating a liquefaction facility constructed according to embodiments. |
| Permitting-conventional liquefaction facilities require permitting for all aspects of the liquefaction facility. | Permitting-permitting requirements for liquefaction facilities according to embodiments may be reduced due to integration of the liquefaction facility with an industrial facility for which many of the required permits may have been previously obtained or obtained in conjunction with each other in a single application. This may lower the CAPEX associated with constructing a liquefaction facility according to embodiments, as well as reduce the time required to complete construction of the liquefaction facility, therefore improving the project economics. |
| Natural gas pretreatment-conventional liquefaction facilities require pretreatment of the natural gas prior to producing LNG. | Natural gas pretreatment-liquefaction facilities constructed according to embodiments may require similar or slightly larger amounts of pretreatment when compared to conventional liquefaction facilities, such as to pretreat additional streams prior to performing expansion and letdown of the streams. This may create a negligible increase in CAPEX for constructing a liquefaction facility according to embodiments (e.g., to enlarge pretreatment equipment) as well as a negligible increase in OPEX for operating the liquefaction facility constructed according to embodiments (e.g., to operate and maintain the pretreatment equipment). |
| Cryogenic exchangers/cold box/Expansion turbines-conventional liquefaction facilities utilize cryogenic exchangers, cold boxes, and expansion turbines during the production of LNG. | Cryogenic exchangers/cold box/Expansion turbines-a liquefaction facility according to embodiments may utilize components (e.g., cryogenic exchangers, cold boxes, and expansion turbines during the production of a liquefied gas) similar to those of a conventional liquefaction facility. |
| LNG storage and truck or rail offloading-conventional liquefaction facilities include LNG storage and offloading infrastructure to store and/or distribute the LNG produced by the facility. | LNG storage and truck or rail offloading-because a liquefaction facility constructed according to embodiments is located proximate an industrial site or facility that does not necessarily produce LNG, LIN, or other liquefied industrial gases, a liquefaction facility according to embodiments will experience similar CAPEX to a conventional liquefaction facility with respect to infrastructure for storage and offloading of the liquefied industrial gases produced by the facility. |
| Heavy hydrocarbon removal system-conventional liquefaction facilities includes a heavy hydrocarbon removal system. | Heavy hydrocarbon removal system-like a conventional liquefaction facility for producing LNG, a liquefaction facility constructed according to embodiments would also include a heavy hydrocarbon removal system. Accordingly, a liquefaction facility according to embodiments will experience similar CAPEX and OPEX when compared to a conventional liquefaction facility with respect to infrastructure for providing the heavy hydrocarbon removal system. |

| Components conventionally provided at a liquefaction facility for producing LNG | Comparison of components at a multipoint liquefied gas production facility according to embodiments |
|---|---|
| Safety, hazard and fire monitoring systems-conventional liquefaction facilities | Safety, hazard and fire monitoring systems-at a liquefaction facility constructed according to embodiments, the costs associated with providing these systems is reduced due to integration with an industrial site or facility where such systems are typically present. Thus, rather than providing a completely independent installation of such systems, the liquefaction facility according to embodiments will tie-in to and utilize the infrastructure of these systems, which will reduce the CAPEX associated with constructing the liquefaction facility according to embodiments. |
| Utility and auxiliary systems-conventional liquefaction facilities must provide completely new installations of utility and auxiliary systems, such as power systems, cooling water systems, instrument air, utility gas, etc.. | Utility and auxiliary systems-at a liquefaction facility constructed according to embodiments, the costs associated with providing these systems is reduced due to integration with an industrial site or facility where such systems are typically present. Thus, rather than providing a completely independent installation of such systems, the liquefaction facility according to embodiments will tie-in to and utilize the infrastructure of these systems, which reduces the CAPEX associated with constructing the liquefaction facility according to embodiments. |
| Ship loading docks and jetty-significant CAPEX is incurred when constructing conventional liquefaction facilities for providing access to ship loading docks and jetty. | Ship loading docks and jetty-a liquefaction facility according to embodiments may be located proximate to an industrial facility where access to ship loading docks and jetty is or will be present, such as a methanol production facility. This may significantly reduce CAPEX associated with constructing a liquefaction facility according to embodiments. |
| Refrigeration Compressor-conventional liquefaction facilities require one or more refrigeration compressors to produce LNG. | Not required-a liquefaction facility according to embodiments does not require a refrigeration compressor. Instead, a liquefaction facility according to embodiments utilizes refrigeration capacity provided by the letdown of one or more gas streams to produce LNG, LIN, or another liquefied gas. This reduces the energy consumption of the liquefaction facility, thereby reducing the liquefaction facility's OPEX and carbon footprint, as well as reduces the CAPEX associated with constructing the liquefaction facility. |
| High voltage switchgear-conventional liquefaction facilities require new construction and installation of high voltage switchgear to provide power to the facility, such as to power the refrigeration compressor. | High voltage switchgear-a liquefaction facility according to embodiments does not require high voltage switchgear to be provided due to the limited energy required. This reduces the CAPEX associated with constructing a liquefaction facility according to embodiments. |

The configuration of the liquefaction facility may be determined based on geographic information, availability of alternative resources (e.g., sources other than the plurality of components, for example, utilizing nearby letdown rather than installing compression units or utilizing existing or proposed docks, jetties, flares, cooling water, instrument air or other utilities), regulations associated with constructing and operating the liquefaction facility, a desired internal rate of return (IRR) for the liquefaction facility, other factors, or a combination thereof.

Constructing the liquefaction facility with the plurality of components may require a greater initial CAPEX than constructing the liquefaction facility without one or more of the plurality of components, as detailed in the table above. In addition, OPEX for producing LNG, LIN, or another type of liquefied gas at a liquefaction facility that includes the plurality of components may be higher than an OPEX for producing the same type of liquefied gas at a liquefaction facility that does not include one or more of the plurality of components, as detailed in the table above. Systems, methods, and apparatuses disclosed herein may be configured to receive a proposed configuration for a liquefaction facility, and, based on the proposed configuration, generate at least one alternative configuration for the liquefaction facility. An amount of CAPEX required to construct the liquefaction facility using any of the at least one alternative configurations is lower than an amount of CAPEX required to construct the liquefaction facility using the proposed configuration. Additionally, OPEX for producing a liquefied gas at the liquefaction facility is lower using any of the at least one alternative configurations relative to the proposed configuration. One example is the utilization of the wasted free expansion of the conventional systems. The systems, methods, and apparatuses may also be configured to generate a report that includes estimates of CAPEX and OPEX for each configuration (e.g., the proposed configuration and at least one of the alternative configurations) of the liquefaction facility. The report may also include an estimated internal rate of return (IRR) for each configuration of the liquefaction facility, and may also include one or more geographic location recommendations associated with constructing the liquefaction facility using at least one of the alternative configurations.

Configuring a liquefaction facility according to one or more of the embodiments disclosed herein may also reduce or eliminate delays for initiating production of a liquefied gas at the liquefaction facility and increase operational reliability of, and ease the permitting requirements for, the liquefaction facility. Liquefaction facilities configured according to one or more aspects of the present disclosure may also be scaled up from an alternative configuration to the proposed configuration incrementally over time, if desired. For example, expansion of a gas at an existing or proposed industrial site may be utilized to provide refrigeration capacity at the liquefaction facility. If the existing site is shut down for any reason, additional components may be added to the liquefaction facility to thereby continue producing the liquefied gas at the liquefaction facility according to the proposed configuration. This may, however, cause one or more of the initial CAPEX and OPEX advantages of the alternative configuration to be lost. In an additional aspect, operational safety of the liquefaction facility may be increased by placing the liquefaction facility proximate to an existing or proposed industrial site. Additional aspects for configuring a liquefaction facility, and benefits provided by configuring the liquefaction facility according to the present disclosure are described in more detail below.

Embodiments of the present disclosure may provide a liquefaction facility that facilitates "zero energy" LNG production (e.g., using the refrigeration capabilities provided by the letdown of natural gas and the letdown of nitrogen at an existing or proposed industrial facility). This may reduce the costs and development of infrastructure used in the manufacturing of LNG, LIN, or another liquefied gas, and, in some embodiments, may enable additional capacity to be provided by a natural gas source and/or a nitrogen source, as described in more detail below. It is noted that the term "zero energy" does not necessarily mean that no power or energy is provided to the liquefaction facility. Rather, the term "zero energy" means that the liquefaction facility is operated with marginal power consumption relative to conventional liquefaction facilities. For example, liquefaction facilities according to embodiments may consume power in terms of kilowatts (kWs) (e.g., for auxiliary equipment such as cooling water, air fans, lube oil pumps, and the like), whereas conventional liquefaction facilities typically consumer power in terms of megawatts (MWs) (e.g., to power refrigeration components that consume large amounts of power).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 7A is a block diagram illustrating a composition of components at a candidate location for a proposed liquefaction facility according to embodiments;

FIG. 7B is a block diagram illustrating a footprint of an available area at a candidate location and a footprint of a liquefaction facility according to a proposed configuration according to embodiments;

FIG. 7C is a block diagram illustrating a footprint of an available area at a candidate location and a footprint of a liquefaction facility according to an alternative configuration according to embodiments;

FIG. 7D is a block diagram illustrating a footprint of an available area at a candidate location and a footprint of a liquefaction facility according to a proposed configuration according to embodiments; and FIG. 7E is a block diagram illustrating a footprint of an available area at a candidate location and a footprint of a liquefaction facility according to an alternative configuration according to embodiments.

DETAILED DESCRIPTION OF THE INVENTION

Figure 1:
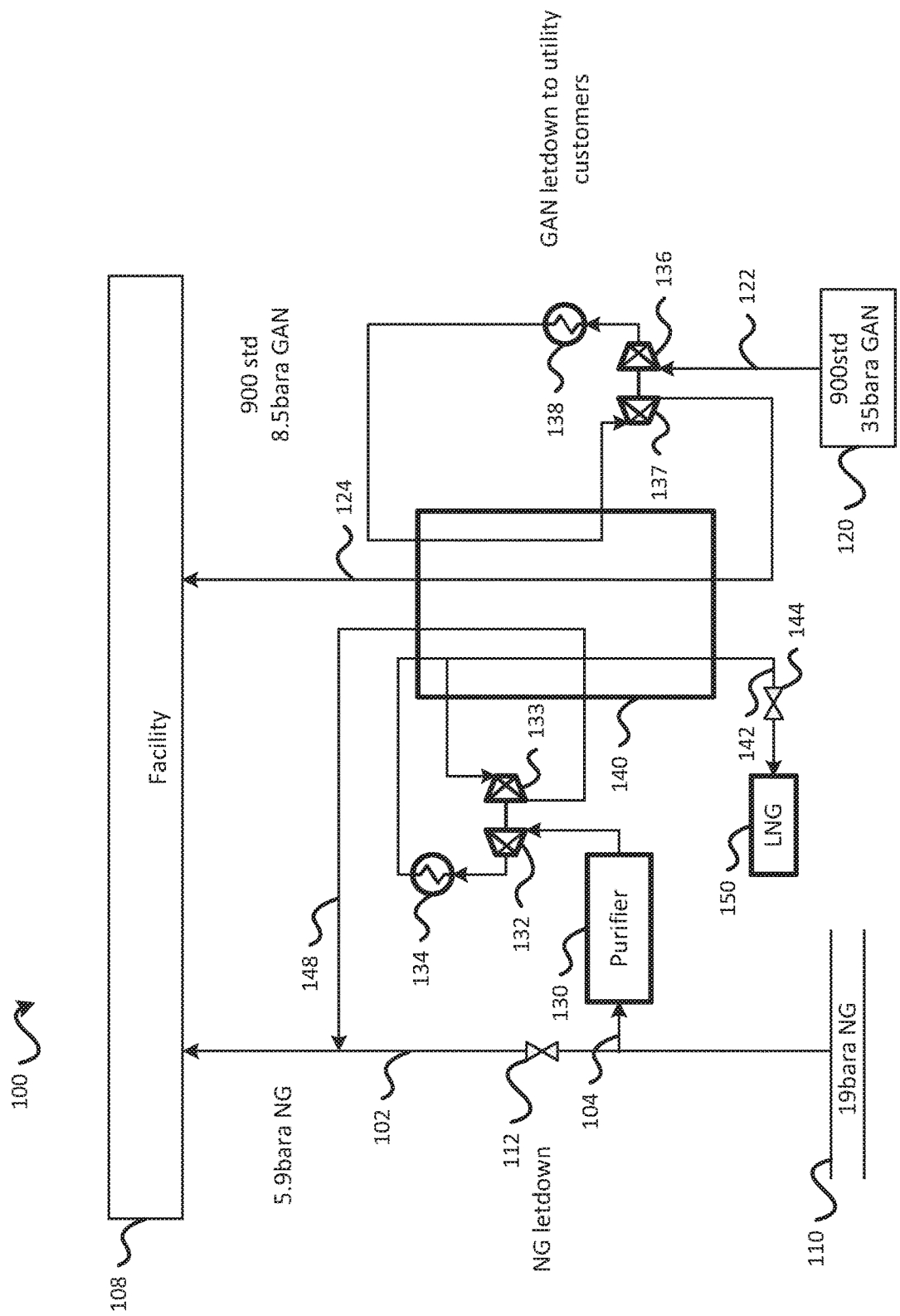
FIG. 1 is a block diagram illustrating an embodiment of system configured to perform a process that provides for "zero energy" liquefied natural gas (LNG) production using refrigeration capabilities provided by the letdown of natural gas and the letdown of gaseous nitrogen (GAN) at a location that is proximate to both the letdown of the natural gas and the nitrogen to one or more consumers.

Referring to FIG. 1, a block diagram illustrating an embodiment of system configured to perform a process that provides for "zero energy" liquefied natural gas (LNG) production using refrigeration capabilities provided by the letdown of natural gas and the letdown of gaseous nitrogen (GAN) at a location that is proximate to both the letdown of the natural gas and the nitrogen to one or more consumers is shown as a system 100. In an embodiment, the process performed by the system 100 may be configured such that LNG and/or LIN can be produced at a lower cost as compared to a situation without the benefit of the letdown of the nitrogen and/or natural gas. It is noted that the embodiments of liquefaction facilities disclosed herein may also be suitable for production of other liquefied gases, such as ethane, hydrogen, methane, carbon dioxide, natural gas liquids (NGLs), and ethylene. Therefore, embodiments of the present disclosure are not to be limited to production of LNG and/or LIN. In an embodiment, the location of the system 100 may be determined from among a plurality of candidate locations, as described in more detail below with reference to FIGS. 4-6. In an embodiment, the location may correspond to, or may be proximate to, a facility 108 where the natural gas and GAN are used for various purposes and processes.

As shown in FIG. 1, a tie-in line 102 provides the facility 108 with access to a natural gas source 110 (e.g., a natural gas pipeline), and includes a valve 112, which may be utilized by the facility 108 to letdown natural gas from the natural gas source 110. Additionally, the system 100 includes a purifier 130, one or more natural gas boosters 132, a natural gas aftercooler 134, one or more natural gas turbines 133, a cycle exchanger 140, and a second tie-in line 104, which may facilitate the production of refrigeration. For example, the second tie-in line 104 may provide a portion of the natural gas from the natural gas source 110 to the purifier 130, which may remove one or more impurities (e.g., water, $CO_2$) from the stream of natural gas to produce a purified stream, and then the purified stream may be provided to the one or more natural gas boosters 132. The one or more natural gas boosters 132 may be configured to compress the purified stream to generate a stream of natural gas, which may be cooled by the aftercooler 134 prior to providing the stream to the cycle exchanger 140. The cycle exchanger 140 may operate to further cool the stream output by the natural gas aftercooler 134 to produce LNG, which may then be routed to an LNG storage 150 via an output line 142. In an embodiment, the valve 144 may be replaced by a dense fluid turbine, which may improve efficiency. In an embodiment, a valve 144 may be provided to close off, or otherwise control the rate of flow of the LNG from, the output line 142. As shown in FIG. 1, a portion of the stream output by the natural gas aftercooler 134 may be partially cooled (i.e., exits an intermediate location of the cycle exchanger) within the cycle exchanger 140 before being expanded by natural gas turbine 133, wherein the resulting expanded natural gas flow is sent back to cycle exchanger 140 to provide a portion of the refrigeration needed to liquefy the natural gas exiting cycle exchanger 140 via output line 142.

During operation of the system 100 to produce LNG, a portion of the output of at least one or more natural gas boosters 132 may be fed back into the tie-in line 102 via the output line 148 from turbine 133, where the natural gas may then be provided to the facility 108, which may use the letdown natural gas for various purposes and/or processes. In an embodiment, the valve 112 may be controlled to divert natural gas received from the natural gas source 110 to the LNG production components (e.g., the purifier 130, the one or more natural gas boosters 132 the natural gas aftercooler 134, the natural gas turbine 133, and the cycle exchanger 140), such that all of the letdown natural gas is provided to the facility 108 via the output line 148. In an additional or alternative embodiment, the valve 112 may be provided to divert a portion of the natural gas received from the natural gas source 110 to the LNG production components (e.g., the purifier 130, the one or more natural gas boosters 132, the natural gas aftercooler 134, the natural gas turbine 133, and the cycle exchanger 140), such that some of the letdown natural gas is provided to the facility 108 via the output line 148, while an additional amount of letdown natural gas may be provided to the facility 108 via the tie-in line 102 without passing through the LNG production components. In an embodiment, the natural gas from the natural gas source 110 may be received at high pressure (e.g., approximately 19 bara in this particular example, but could be between 10 to 100 bar), and the natural gas provided to the facility 108 may be provided at a lower pressure (e.g., approximately 5.9 bara in this particular example). In additional or alternative embodiments, the source pressure and output pressures for natural gas provided by the system 100 may be higher than, or lower than these pressures depending on the needs of the facility 108 and the configuration of the natural gas source 110.

Additionally, the system 100 includes one or more additional nitrogen boosters 136, an nitrogen aftercooler 138 and one or more nitrogen turbines 137, which may facilitate the letdown of GAN from a nitrogen source 120. A tie-in line 122 may be provided to provide nitrogen (e.g., from a nitrogen pipeline or other source, such as an output of an air separation unit ("ASU") at a location where the liquefaction facility is located) to the one or more nitrogen boosters 136, which compress the input nitrogen to produce a nitrogen rich stream that is then provided to the nitrogen aftercooler 138 where the nitrogen rich stream is then at least partially cooled within cycle exchanger 140 prior to being expanded in nitrogen turbine 137 and then sent back to cycle exchanger 140 for providing a portion of the refrigeration needed to cool the nitrogen gas and liquefy the natural gas. In an embodiment, the natural gas rich stream produced by the one or more boosters 132 and the aftercooler 134 may be cooled in exchanger 140 and expanded in turbine 133 to approximately −100° C. Thus, liquid formation may be avoided in the natural gas turbine 133. At low pressure, natural gas may require cooling to approximately −160° C. to obtain LNG. The refrigeration provided by the expansion of the natural gas stream by the natural gas turbine 133 and the nitrogen turbine 137 may provide refrigeration in the range of −100° C. and −160° C., respectively, thereby facilitating production of LNG that is provided to the outlet 142. After warming in the cycle exchanger 140, the nitrogen gas is eventually provided to the facility 108 via an output line 124. The letdown of nitrogen may provide additional cooling that may be used to produce the LNG provided to the LNG storage 150. In an embodiment, the GAN from the nitrogen source 120 may be received at high pressure (e.g., approximately 900 std, 35 bara in this particular example), and the GAN provided to the facility 108 may be provided at a lower pressure (e.g., approximately 900 std, 8.5 bara in this particular example). In additional or alternative embodiments, the source pressure and output pressures for nitrogen provided by the system 100 may be higher than, or lower than these pressures depending on the needs of the facility 108 and the configuration of the nitrogen source 120.

In an embodiment, the system 100 may be constructed by adding additional components to those already existing or proposed at the facility 108. For example, in an embodiment, there may be integration with an existing nitrogen liquefier. The one or more additional boosters 136, the additional aftercooler 138, the cycle exchanger 140, the tie-in line 122, the output line 124, and the nitrogen letdown valve (not shown) may have been implemented upon construction of the facility 108. The purifier 130, the one or more boosters 132, the booster aftercooler 134, the output line 142, the valve 144, and the LNG storage 150 may be provided upon identification the location of the facility 108 as a selected location for implementing the system 100. The location of the facility 108 may be selected, at least in part, based on the ability to utilize the existing infrastructure (e.g., the existing components listed above) to facilitate "zero energy" LNG production (e.g., using the refrigeration capabilities provided by the letdown of natural gas and the letdown of nitrogen at the location of the facility 108). This may reduce the costs and development of infrastructure used in the manufacturing of LNG, LIN, or another liquefied gas, and, in some embodiments, may enable additional capacity to be provided by the natural gas source 110 and/or the nitrogen source 120, as described in more detail below. It is noted that the term "zero energy" does not necessarily mean that no power or energy is provided to the liquefaction facility. Rather, the term "zero energy" means that the liquefaction facility is operated with marginal power consumption relative to conventional liquefaction facilities. For example, liquefaction facilities according to embodiments may consume power in terms of kilowatts (kWs) (e.g., for auxiliary equipment such as cooling water pumps, air fans, lube oil pumps, and the like), whereas conventional liquefaction facilities typically consumer power in terms of megawatts (MWs) (e.g., to power refrigeration components that consume large amounts of power).

In an additional or alternative embodiment, the components existing or proposed at the facility 108 may include a nitrogen source 110, the tie-in line 102 and the valve 112, and a nitrogen tie-in line (not shown in FIG. 1) and accompanying nitrogen valve (not shown in FIG. 1), and the remaining components illustrated in FIG. 1 may have been added to the facility 108 in response to selection of the location of the facility 108 as a location for implementing the system 100. In an embodiment, the location of the facility 108 may be selected, at least in part, based on the ability to utilize the existing infrastructure (e.g., the existing components listed above) to facilitate "zero energy" production of LNG, LIN, or another liquefied gas (e.g., using the refrigeration capabilities provided by the letdown of natural gas and the letdown of nitrogen at the location of the facility 108, and/or letdown of another gas, such as letdown of a gas from a tertiary source, such as a gas output from the facility 108). This may reduce the costs and development of infrastructure used in the manufacturing of LNG, and, in some embodiments, may enable additional capacity to be provided by the natural gas source 110 and/or the nitrogen source 120, as described in more detail below. In an additional or alternative embodiment, the system 100 may be further configured to utilize excess nitrogen (e.g., nitrogen in excess of the demand for nitrogen at the facility 108) to produce LNG and/or LIN.

It is noted that in the embodiments illustrated in FIG. 1 and the description of FIG. 1, the facility 108 is described as being a single facility. However, in some embodiments, the system 100 may include two or more facilities, and the natural gas and/or the nitrogen that is letdown may be utilized one or both facilities. For example, if a first facility and a second facility are present or proposed, the medium pressure letdown gas may be split and distributed in any combination to both facilities.

Figure 2:
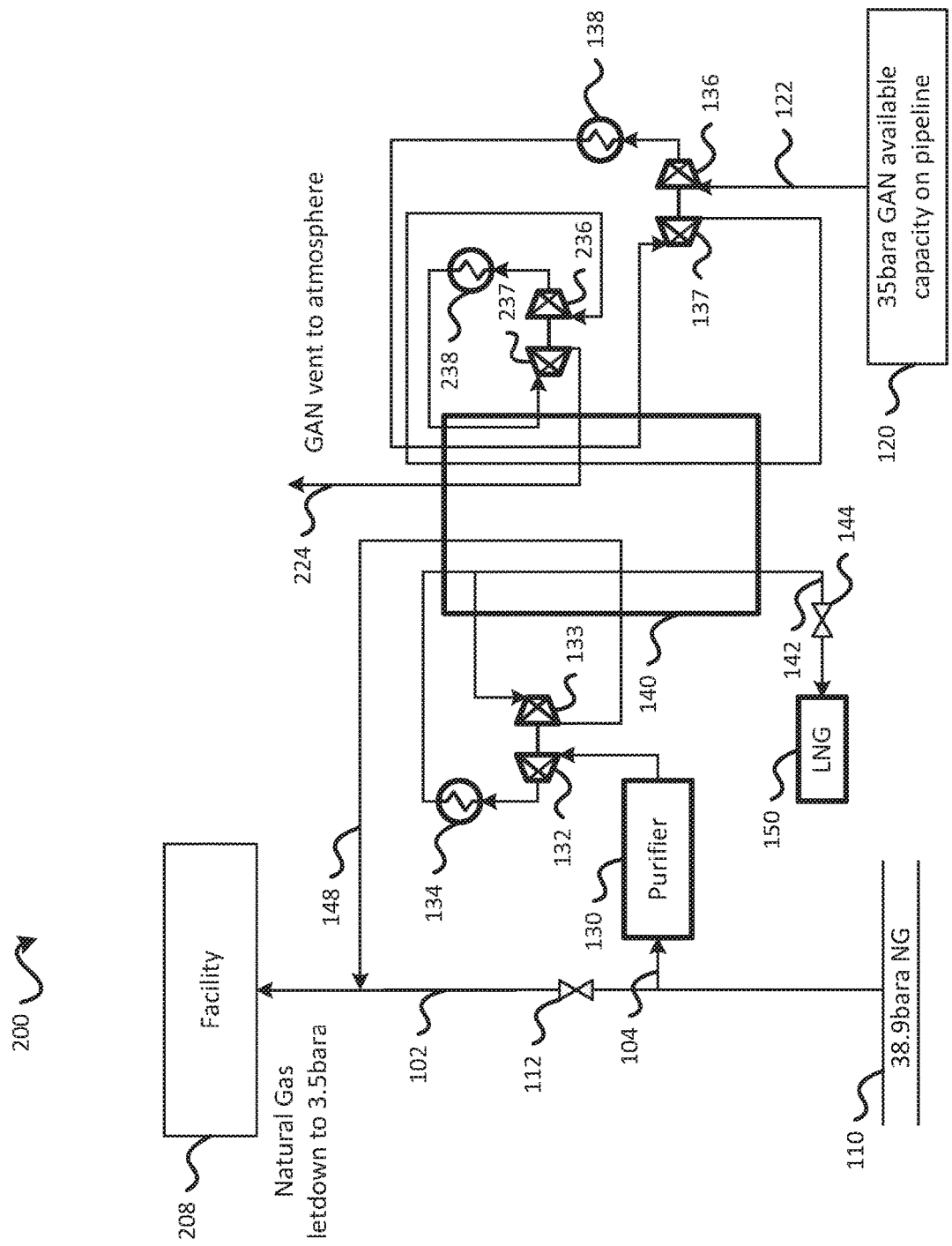
FIG. 2 is a block diagram illustrating another embodiment of a system configured to perform a process that provides for reduced energy liquefied natural gas (LNG) production using refrigeration capabilities of letdown of natural gas to one or more consumers and let down of gaseous nitrogen (GAN) from available network capacity.

Referring to FIG. 2, a block diagram illustrating another embodiment of a system configured to perform a process that provides for reduced energy liquefied natural gas (LNG) production using refrigeration capabilities of letdown of natural gas to one or more consumers and let down of gaseous nitrogen (GAN) from available network capacity is shown as a system 200. In the embodiment illustrated in FIG. 2, reduced energy consumption by the system 200 is realized by not requiring a compressor to produce LNG at the liquefaction facility. This reduces the CAPEX associated with constructing the liquefaction facility of the system 200. Further, the OPEX for operating the liquefaction facility is reduced when compared to conventional liquefaction facilities because there is no OPEX associated with utilizing the refrigeration provided by the letdown of the natural gas and the letdown of the nitrogen. As shown in FIG. 2, the system 200 includes the following components described above with respect to FIG. 1: the natural gas source 110, the nitrogen source 120, the tie-in lines 102, 104, 122, the valves 112, 144, the purifier 130, the one or more natural gas boosters 132, the natural gas aftercooler 134, the one or more natural gas turbines 133, the one or more nitrogen boosters 136, the nitrogen aftercooler 138, the one or more nitrogen turbines 137, the cycle exchanger 140, the output line 142, the output line 148, and the LNG storage 150. These components may facilitate the production of LNG and/or LIN in a manner similar to the process described above with reference to FIG. 1. Further, in additional or alternative embodiments, the system 200 may be utilized to produce liquefied gases other than LNG, as explained above with reference to FIG. 1.

However, the system 200 of FIG. 2 differs from the system 100 of FIG. 1 in that a facility 208 may not utilize nitrogen. Thus, in the system 200, nitrogen that has been letdown to produce the LNG provided to the LNG storage 150 may be vented to the atmosphere via a vent 224. In this embodiment, a one or more second nitrogen boosters 236 and one or more second nitrogen turbines 237 are provided. In the embodiment shown in FIG. 2, the nitrogen compression/expansion cycle is shown to go from nitrogen booster 136 to nitrogen turbine 137, followed by recompression in the one or more second nitrogen boosters 236, cooling in aftercooler 238, partial cooling in cycle exchanger 140, and then expansion in the one or more second nitrogen turbines 237 before warming in cycle exchanger 140 and then venting to the atmosphere via vent 224. FIG. 2 illustrates that in some embodiments, the desired pressure resulting from the letdown of a gas may not be achieved by passing the gas through a single turbine. Thus, as illustrated in FIG. 2, the letdown of the gas from a first pressure (e.g., a pressure provided by a source of the gas, such as a pipeline) to a second pressure (e.g., a pressure suitable for use by a facility or for venting) may require multi-stage expansion. In an embodiment, the pressure at the outlet of the booster 136 of FIG. 2 may be approximately 67 bara, the pressure at the outlet of the turbine 137 may be approximately 8 bara, the pressure at the outlet of the booster 236 may be approximately 12 bara, and the pressure at the outlet of the turbine 237 may be approximately 1.2 bara. The use of multi-stage expansion may provide more refrigeration capacity than single-stage expansion in some embodiments.

In an embodiment, the system 200 may be constructed by adding additional components to those already existing or proposed at the facility 208. For example, in an embodiment, the facility 208 may have been constructed or proposed to include the tie-in line 102 to provide access to the natural gas provided by the natural gas source 110, and the valve 112 to facilitate the letdown of the natural gas, and the LNG production components (e.g., the tie-in lines 104, 122, the one or more nitrogen boosters 136, the nitrogen aftercooler 138, the cycle exchanger 140, the tie-in line 122, the vent 224, the one or more second nitrogen boosters 236, the one or more second nitrogen turbines 237, and the aftercooler 238) may be provided upon identification of the location of the facility 208 as a selected location for implementing the system 200. The location of the facility 208 may be selected, at least in part, based on the ability to utilize the available infrastructure (e.g., the tie-in line 102 to the natural gas source 110) to facilitate reduced energy LNG and/or LIN production (e.g., using the refrigeration capabilities provided by the letdown of natural gas and the letdown of nitrogen at the location of the facility 208), as described in more detail below. This may reduce the costs and development of infrastructure used in the manufacturing of LNG, as described in more detail below.

It is noted that in the embodiment illustrated in FIG. 2 and the description of FIG. 2, the facility 208 is described as being a single facility. However, in some embodiments, the system 200 may include two or more facilities, and the natural gas that is letdown may be utilized by all, or less than all of the two or more facilities. For example, if a first facility and a second facility are present, the medium pressure letdown gas may be split and distributed in any combination to both facilities.

Figure 3:
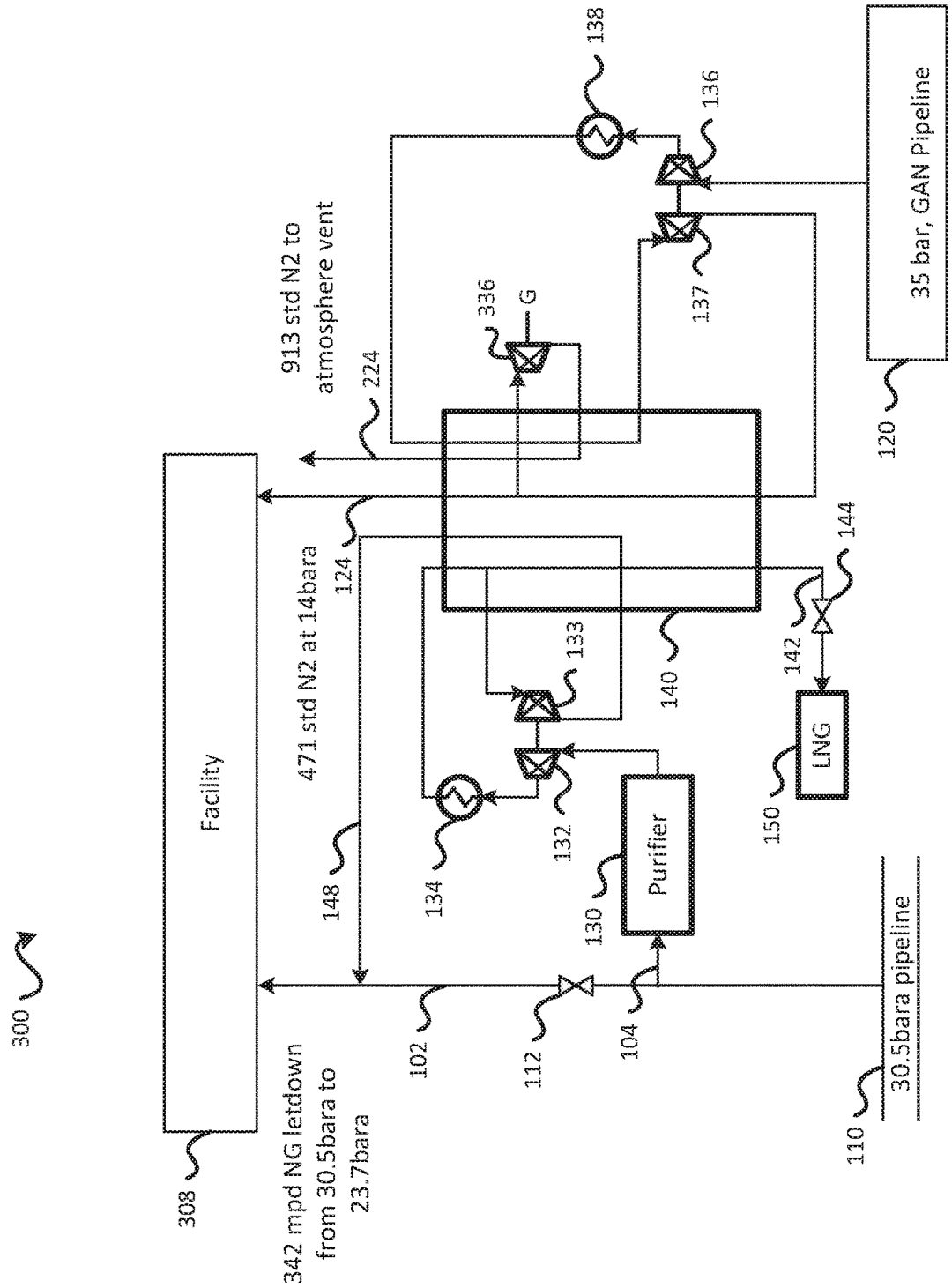
FIG. 3 is a block diagram illustrating another embodiment of a system configured to perform a process that provides for significantly reduced energy liquefied natural gas (LNG) production using refrigeration capabilities of letdown of natural gas to one or more consumers and let down of gaseous nitrogen (GAN) to one or more consumers and from available network capacity at a location that is proximate to both the letdown of the natural gas and the nitrogen.

Referring to FIG. 3, a block diagram illustrating another embodiment of a system configured to perform a process that provides for very reduced energy liquefied natural gas (LNG) production using refrigeration capabilities of letdown of natural gas to one or more consumers and let down of gaseous nitrogen (GAN) to one or more consumers and from available network capacity at a location that is proximate to both the letdown of the natural gas and the nitrogen is shown as a system 300. In the embodiment illustrated in FIG. 3, very reduced energy consumption by the system 200 is realized by utilizing the energy of the nitrogen letdown to facility 308. When compared to the system 200 of FIG. 2, the system 300 of FIG. 3 utilizes less energy because the letdown of at least a portion of the nitrogen is provided to the facility 308, with the remaining portion of the letdown nitrogen being vented, whereas, in the system 200 of FIG. 2, all of the letdown nitrogen is vented. Thus, the OPEX for the system 300 may be lower than the OPEX of the system 200 of FIG. 2. As shown in FIG. 3, the system 300 includes the following components described above with respect to FIG. 1: the natural gas source 110, the nitrogen source 120, the tie-in lines 102, 104, 122, the valves 112, 144, the purifier 130, the one or more natural gas boosters 132, the one or more natural gas turbines 133, the natural gas aftercooler 134, the one or more nitrogen boosters 136, the one or more nitrogen turbines 137, the nitrogen aftercooler 138, the cycle exchanger 140, the output line 142, the output line 148, and the LNG storage 150, and includes the vent 224 of FIG. 2. Additionally, in the embodiment illustrated in FIG. 3, the system 300 includes another nitrogen turbine 336 that may receive a portion of the letdown GAN, expand the higher pressure GAN, thereby providing power to generator G, with the expanded GAN then being cycled through the cycle exchanger 140 prior to being vented to the atmosphere via the vent 224. The generator may be used to provide at least a portion of the power consumed by the liquefaction facility, thereby reducing the energy costs of the system 300. It is noted that in other embodiments, the generator may be replaced with a booster (not shown in FIG. 3) depending on the ratio of flows to the facility 308 and the vent. However, if the ratio of flows makes it difficult to match the speeds of the turbine and booster, the system 300 should be configured with the generator, rather than the booster. These components may facilitate the letdown of natural gas and GAN for use by a facility 308 for various purposes and process, while simultaneously facilitating production of LNG and/or LIN in a manner similar to the process described above with reference to FIG. 1, and may further facilitate venting of nitrogen to the atmosphere as described above with reference to FIG. 2. By including the vent 224 to disperse excess GAN to the atmosphere, the system 300 may facilitate higher volumes of LNG production relative to the embodiments described above with reference to FIG. 1. For example, when the demand for nitrogen at the facility 308 is low, more GAN may be vented via the vent 224, thereby enabling LNG and/or LIN production to remain at a constant or higher level, whereas in some configurations and embodiments of the system 100, the production of LNG may be constrained by the demand for GAN at the facility 108. This alternative embodiments provides an extra degree of freedom, thereby allowing the operator much more flexibility in overall operations, subject to constraints imposed by matching the speed of the turbine 336 with a booster in some embodiments.

In an embodiment, the system 300 may be constructed by adding additional components to those already existing or proposed at the facility 308. For example, in an embodiment, the facility 308 may have been constructed to include the tie-in line 102 to provide access to the natural gas provided by the natural gas source 110, and the valve 112 to letdown the natural gas, and the LNG production components (e.g., the tie-in lines 104, 122, the one or more nitrogen boosters 136, the nitrogen turbine 137, the nitrogen aftercooler 138, the cycle exchanger 140, the vent 224, the second nitrogen booster 236, the second nitrogen turbine 237, and the aftercooler 238) may be provided upon identification of the location of the facility 308 as a selected location for implementing the system 200. The location of the facility 308 may be selected, at least in part, based on the ability to utilize the available infrastructure (e.g., the tie-in line 102 to the natural gas source 110) to facilitate very reduced energy LNG production (e.g., using the refrigeration capabilities provided by the letdown of natural gas and the letdown of nitrogen at the location of the facility 308), as described in more detail below. This may reduce the costs and development of infrastructure used in the manufacturing of LNG, as described in more detail below. In an embodiment, the system 300 may be constructed to produce some LIN.

Figure 4:
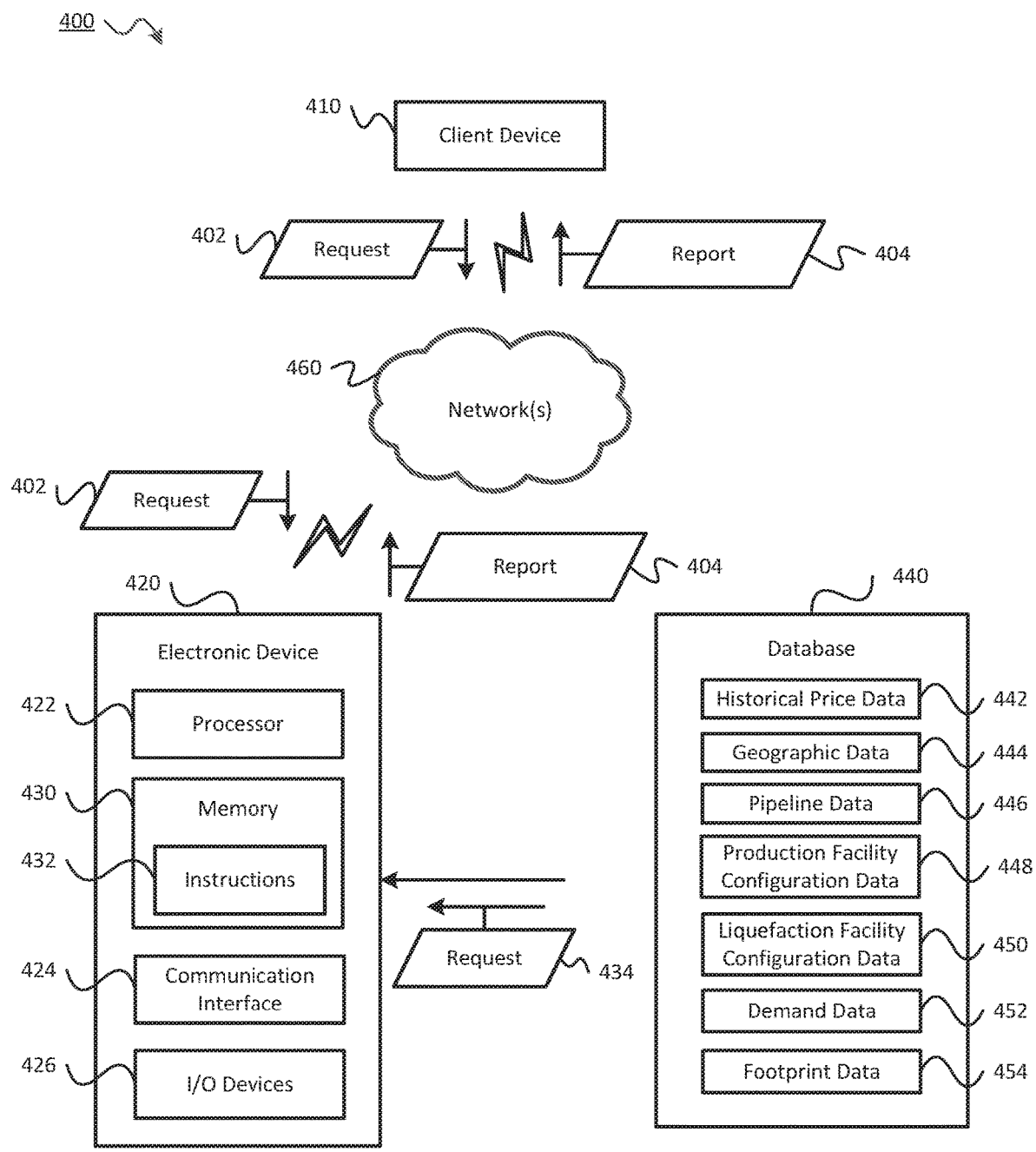
FIG. 4 is a block diagram of a system operable to determine an alternative configuration for a liquefaction facility according to embodiments.

Referring to FIG. 4, a block diagram of a system operable to determine a configuration for a liquefaction facility according to embodiments is shown as a system 400. As shown in FIG. 4, the system 400 includes a client device 410, an electronic device 420, a database 440, and a network(s) 460. In an aspect, the client device 410 may be a personal computing device, a laptop computing device, a tablet computing device, a smartphone, or any other electronic device operable to perform the operations of the client device 410 according to embodiments.

As shown in FIG. 4, the electronic device 420 includes a processor 422, a memory 430, a communication interface 424, and input/output (I/O) devices 426. In an aspect, the electronic device 420 may be a personal computing device, a laptop computing device, a tablet computing device, a smartphone, or any other electronic device operable to perform the operations of the electronic device 420 according to embodiments. The memory 430 may include random access memory (RAM) devices, read only memory (ROM) devices, one or more hard disk drives (HDDs), flash memory devices, solid state drives (SSDs), erasable programmable read only memory (EPROM) devices, electrically erasable programmable read only memory (EEPROM) devices, magneto-resistive random access memory (MRAM) devices, optical memory devices, cache memory devices, other memory devices configured to store data in a persistent or non-persistent state, or a combination of different memory devices. Furthermore, the memory 430 may include computer-readable storage devices such as a compact disk (CD), a re-writable CD, a digital video disc (DVD), a re-rewritable DVD, etc. The memory 430 may store instructions 432. The instructions 432, when executed by the processor 422, may cause the processor 422 to perform operations associated with determining an alternative configuration for a liquefaction facility, as described herein with reference to FIGS. 1-6.

The I/O devices 426 may include a printer, a mouse, a keyboard, a touchscreen display device, a scanner, a numeric keypad, other types of I/O devices, or a combination thereof. The communication interface 424 may be configured to communicatively couple the electronic device 420 to one or more networks, such as the network(s) 460, as shown in FIG. 4. The communication interface 424 may be configured to communicatively couple the electronic device 420 to the network 460 via a wired or wireless connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) protocol, a 4th Generation (4G)/long term evolution (LTE) protocol, etc.).

The network(s) 460 may be a wired network, a wireless network, or may include a combination of wired and wireless networks. For example, the network 460 may be a local area network (LAN), a wide area network (WAN), a wireless WAN, a wireless LAN (WLAN), a metropolitan area network (MAN), a wireless MAN network, a cellular data network, a cellular voice network, the internet, another type of network, or a combination of these networks. Additionally, the network(s) 460 may include multiple networks operated by different entities (e.g., different network service providers).

The electronic device 420 may be in communication with a database, such as the database 440, and may use information stored at the database 440 to determine a configuration of a liquefaction facility. In an aspect, the database 440 may be stored at the electronic device 420 (e.g., at the memory 430). In an additional or alternative aspect, the database 440 may be stored external to the electronic device 420 (e.g., at a network storage device not shown in FIG. 4), and may be accessible to the electronic device 420 via the network(s) 460. Additionally or alternatively, the database 440 may be a distributed database stored at a plurality of locations and/or storage devices accessible to the electronic device 420 via the network(s) 460.

During operation, the electronic device 420 may receive a request 402 from the client device 410 via the network(s) 460. The request 402 may include information associated with a proposed configuration for the liquefaction facility (e.g., one or more of the liquefaction facilities described above with reference to FIGS. 1-3). For example, the request 402 may include information specifying a plurality of components that are to be integrated to construct the liquefaction facility. Once constructed, the plurality of components are operational to receive a feedstock (e.g., natural gas and/or gaseous nitrogen) and to liquefy the feedstock using the proposed liquefaction facility configuration. In an embodiment, the liquefaction facility may provide for "zero energy," very reduced energy, or at least reduced energy LNG production using refrigeration capabilities of letdown of natural gas and let down of gaseous nitrogen, as described above with reference to FIGS. 1-3. For example, the liquefaction facility may utilize the letdown of natural gas, gaseous nitrogen, and/or other industrial gases as described in the quadruple point location discussed earlier to produce LNG and/or LIN. In an embodiment, the liquefaction facility may utilize letdown of other gases provided by tertiary sources, such as letdown of gas from a medium pressure source from a methanol production facility or another source, for example, to provide refrigeration capacity for producing LNG, LIN, and/or other liquefied gases.

In response to receiving the request 402, the electronic device 420 may analyze the proposed configuration for the liquefaction facility to identify a type of each of the plurality of components and the requirements (e.g., whether a double or triple point type is to be selected). In an aspect, the type, requirement, and function of each of the plurality of components may be included in the request 402. In an additional or alternative aspect, the electronic device 420 may determine the type, requirement, and function of each of the plurality of components based on liquefaction facility configuration data 450 stored at the database 440.

Based on the analysis of the proposed configuration, the electronic device 420 may estimate a first cost corresponding to an amount of capital expenditure required to construct the liquefaction facility using the proposed configuration, and may estimate a second cost corresponding to operational expenses for operating the liquefaction facility configured according to the proposed configuration over a period of time (e.g., 1 year, 5 years, 10 years, etc.). In an aspect, the period of time may be determined from information included in the request 402.

After analyzing the proposed configuration of the liquefaction facility, the electronic device 420 may determine an alternative configuration or location of the liquefaction facility. The alternative configuration may be different from the proposed configuration. For example, the alternative configuration may omit one or more of the plurality of components indicated in the proposed configuration. To illustrate, based on the requirements of the plurality of components, the electronic device 420 may identify resources accessible to a proposed location for the liquefaction facility. In an embodiment, the proposed location may be indicated in the request 402.

In an embodiment, the electronic device 420 may identify at least one candidate location where one or more components may be added to an alternative configuration, or retained from the proposed configuration of the liquefaction facility. For example, a candidate location corresponding to a methanol production facility may be identified as a location for the liquefaction facility. Methanol production facilities consume large quantities of natural gas as a feedstock and/or fuel, and produce large quantities of tail gases. These gases may be letdown to facilitate LNG and/or LIN production at a liquefaction facility according to embodiments. In some embodiments, refrigeration capacity of the liquefaction facility may be supplemented by providing refrigeration equipment, such as a nitrogen compressor. If the proposed configuration includes the refrigeration equipment, that equipment may be retained in one or more of the alternative configurations generated by the electronic device 420 (e.g., for alternative configurations of the liquefaction facility at candidate location corresponding to methanol production facilities). In an embodiment, the resources (e.g., the natural gas, the nitrogen, or another industrial gas) may be provided (e.g., via pipelines) at pressures greater than 15 bara.

The resources may be determined based on geographic data, expansion valve data, pipeline data, proximity of existing or future jetty locations, loading dock locations (e.g., marine, truck or rail loading dock locations), pipeline pressure letdown locations, and/or other data, or a combination thereof. In an aspect, the geographic data may be stored at the database 440 as geographic data 444 and the pipeline data may be stored at the database 440 as pipeline data 446. The geographic data 444 may include topology data representative of a topology of the proposed location for the liquefaction facility. The pipeline data 446 may include information identifying a plurality of existing pipelines, and may indicate a resource provided by each of the plurality of existing pipelines. The identified resources may be accessible from at least one source external to the liquefaction facility, such as operators or providers of the pipelines, and each of the identified resources may be utilized in the production of LNG and/or LIN at the liquefaction facility using the proposed configuration. For example, the identified resources may include natural gas pipelines, nitrogen pipelines, medium or lower pressure tail gas pipelines, and/or expansion valve data, and/or other pipelines that are accessible to the proposed location for the liquefaction facility. Additional examples of resources that may be provided by pipelines and that may be identified using the pipeline data 446 include water pipelines, steam pipelines, air pipelines, and industrial gas pipelines, as well as off loading facilities, such as rail, jetty, etc.

In an aspect, the electronic device 420 may determine a distance between each of the one or more pipelines and/or expansion valves to the proposed location, and determine whether a distance between the proposed location and each of the one or more pipelines is within a threshold distance. The threshold distance may correspond to a distance at which it is not economically feasible to construct infrastructure for tapping into the pipelines from the proposed location, or a distance at which transmission of a resource provided by the pipeline is subject to pressure drops, or some other factor. In an embodiment, the threshold distance may be ten kilometers. In an additional or alternative embodiment, the threshold distance may be five kilometers. In an additional or alternative embodiment, the threshold distance may be two kilometers. In still another additional or alternative embodiment, the threshold distance may be one kilometer. In yet another additional or alternative embodiment, the threshold distance may be one-half (0.5) kilometer. In yet another additional or alternative embodiment, the threshold distance may be one-fifth (0.2) kilometer. In an embodiment, in addition to determining distances between the proposed location and the one or more pipelines and expansion valves, the electronic device may determine whether sources for gases (e.g., high pressure natural gas sources, high pressure nitrogen sources, medium pressure natural gas returns, medium pressure nitrogen returns, such as pipeline tie-ins, loading systems such as rail, river, dock, road, etc., and sources for utilities, such as cooling water, flare, etc.) are within the threshold distance of the proposed location. In addition to identifying resources accessible via the external sources, such as pipelines, the electronic device 420 may determine whether other resources, such as water, roads, etc., are proximate to, or within the threshold distance of the proposed location.

The electronic device 420 may designate pipelines or other resource sources that are within the threshold distance as accessible pipelines, and may designate resources provided by the accessible pipelines as the resources accessible to the proposed location. The electronic device 420 may determine, based on the proposed configuration information or information stored at the database 440, whether the resources accessible to the proposed location include all of the resources utilized in producing LNG and/or LIN (or another liquid of interest) at the liquefaction facility using the proposed configuration.

The electronic device 420 may identify a subset of the accessible pipelines. The subset of pipelines may include a single pipeline selected from among the accessible pipelines for each resource utilized in the production of LNG and/or LIN at the liquefaction facility using the proposed configuration (or for each resource utilized in the production of LNG and/or LIN that is also included in the resources accessible to the proposed location). In an aspect, the electronic device 420 may estimate an infrastructure cost for each pipeline of the accessible pipelines. For a particular pipeline of the set of pipelines, the infrastructure cost may correspond to a cost to build infrastructure (e.g., a pipeline) from the proposed location to the particular pipeline to provide the proposed location with access to a resource included in the second set of resources. Each pipeline included in the subset of pipelines may be associated with a lowest infrastructure cost for a particular resource of the resources accessible to the proposed location. In an aspect, the infrastructure costs for each pipeline in the subset of pipelines may be accounted for by the electronic device 420 when generating the third cost (e.g., CAPEX associated with constructing the liquefaction facility using the alternative configuration).

To illustrate, the electronic device 420 may determine that the subset of pipelines includes a natural gas pipeline, a nitrogen pipeline, and/or other pipelines (e.g., any other pipelines that provide a gas that may be letdown for the purposes of extracting refrigeration energy or that an end user might want liquefied). The electronic device 420 may estimate an infrastructure cost associated with building infrastructure to tap into each pipeline of the subset of pipelines. For example, the electronic device 420 may estimate an infrastructure cost associated with building infrastructure to tap into the natural gas pipeline and provide natural gas to the liquefaction facility, and may estimate an infrastructure cost associated with building infrastructure to tap into the nitrogen pipeline and provide nitrogen to the liquefaction facility. The electronic device 420 may determine the estimated infrastructure cost for each pipeline based on a distance between the proposed location (or an alternative location) for the liquefaction facility and each of the respective pipelines included in the subset of pipelines. As the distance increases, the costs associated with building the infrastructure may increase. In an aspect, the electronic device 420 may determine whether the distance exceeds a threshold distance. If the distance exceeds the threshold distance, boosters may be necessary to provide the resources to the liquefaction facility in required quantities and with adequate delivery pressure. If boosters are required, the infrastructure costs may increase further.

In some aspects, constructing the liquefaction facility according to an alternative configuration may expedite production of LNG and/or LIN relative to the proposed configuration. For example, the refrigeration compressor is a long lead item from procurement to installation and may dictate the project schedule. This compressor is removed or at least significantly reduced to a more standard off-the-shelf product, for the current proposed application. This reduces the time from project kickoff to product delivery allowing the operator of the liquefaction facility to begin producing liquefied gases sooner and thus improving the project economics.

In an embodiment, the electronic device 420 may be configured to determine at least one additional alternative configuration of the liquefaction facility. The at least one additional alternative configuration may be different from the proposed configuration and the alternative configuration. For example, the at least one additional alternative configuration may correspond to a configuration at an alternative location having access to more resources (e.g., access to more pipelines, access to a river, a jetty, rail, road, etc.), thereby increasing the number of components that may be omitted from the liquefaction facility and reducing CAPEX and OPEX for the at least one additional alternative configuration relative to the proposed configuration and the alternative configuration. Alternatively or additionally, the at least one additional alternative configuration may include a second alternative configuration for the liquefaction facility at the proposed location. For example, a first alternative configuration for the liquefaction facility at the proposed location may not include nitrogen liquefaction, and the second alternative configuration for the liquefaction facility at the proposed location may include an access to a nitrogen pipeline that has the ability to provide additional capacity (e.g., the pipeline is connected to a nitrogen production or compression facility that is not operating at full capacity). Thus, the alternative configurations may provide different configurations across multiple locations, as described above, and/or may provide different configurations at a single location (e.g., a lowest CAPEX configuration, an intermediate CAPEX configuration, and a highest CAPEX configuration associated with the proposed configuration). In an embodiment, the operations of the electronic device 420 may include identifying one or more access points, each of the one or more access points corresponding to a location for providing a tie-in line to provide access to the at least one identified resource to the liquefaction facility. In an embodiment, each of the one or more candidate locations may be identified as a location that provides an access point to at least one of the identified resources. In an embodiment, the operations may further include estimating a cost to construct one or more tie-in lines to provide the access points to one or more of the identified resources.

In an aspect, the request 402 may identify a threshold internal rate of return (IRR), and the electronic device 420 may iteratively determine different alternative configurations to identify an alternative configuration that satisfies the threshold IRR. The electronic device 420 may first determine whether different alternative configurations at the proposed location satisfy the threshold IRR. In an embodiment, if the electronic device 420 fails to identify an alternative configuration satisfying the threshold IRR at the proposed location, the electronic device 420 may identify one or more alternative locations, as described above, and determine whether an alternative configuration satisfying the threshold IRR at one or more of the alternative locations can be identified. In an aspect, the electronic device 420 may identify the alternative locations irrespective of whether an alternative configuration satisfies the threshold IRR and may determine a location (e.g., the proposed location or one of the alternative locations) that provides a highest IRR satisfying the threshold.

The electronic device 420 may be configured to estimate, for each determined configuration, a cost corresponding to an amount of CAPEX required to construct the liquefaction facility using a particular determined configuration, and may estimate, for each determined configuration, a cost corresponding to an amount of OPEX for operating the liquefaction facility when configured according to each of the determined configurations. In an additional or alternative embodiment, the OPEX for the all configurations of the liquefaction facility may vary depending on the number of resources accessible to the location of the liquefaction facility. However, the OPEX is lower for each of the alternative configurations relative to the proposed configuration. The electronic device 420 may also be configured to calculate an IRR for each of the configurations of the liquefaction facility.

Many of the costs associated with the OPEX fluctuate on the daily market. For example, the price of natural gas, fluctuates frequently (e.g., daily/hourly). In some configurations, the cost of the feedstock may account for between eighty percent (80%) and ninety percent (90%) of the OPEX for the liquefaction facility. This high liquefier feedstock cost makes it particularly advantageous to locate the liquefaction unit near another high volume user industrial site such that purchasing agreements can be improved due to the higher volume basis. Also, because the costs associated with the feedstock fluctuate frequently, the OPEX may also fluctuate frequently, leading to uncertainty of the OPEX for the liquefaction facility. Similarly, prices associated with the product (e.g., LNG and possibly LIN) can also fluctuate with time. Therefore, in one embodiment, the system 400 can calculate whether or not to produce additional LNG and/or LIN based on current or anticipated prices of both feedstocks and products, thereby further improving rates of return. In an embodiment, historical price data 442 may be used by the electronic device 420 for such purposes. In an embodiment, demand data 452 may be stored at the database 440, and may be used to forecast or predict demand for one or more resources, which may include demand for resources used to produce the LNG and/or LIN, and/or demand for the LNG and/or LIN produced by the liquefaction facility.

In an embodiment, constructing the liquefaction facility according to the alternative configuration may also reduce carbon dioxide emissions of the liquefaction facility and other locations. For example, constructing the liquefaction facility according embodiments may increase the operational capacity and/or efficiency of one or more external facilities. For example, an operator of a facility that produces one of the resources used during the production of LNG and/or LIN may increase the output of the resource produced by the facility, and the additional amount of the resource produced by the facility may be transported (e.g., via a pipeline) to the liquefaction facility to facilitate the production of the LNG and/or LIN. Operating the resource production facility at a higher output capacity may allow components of the resource production facility to be operated more efficiently (e.g., lower emissions, less wear and tear on components of the facility, such as generators and compressors due to frequent starting/stopping, ramping, etc.). In an embodiment, an operator of resource production facilities (e.g., nitrogen and natural gas production facilities and/or pipelines) may also operate the liquefaction facility, thereby enabling the operator to increase output of resources (e.g., natural gas and nitrogen) from its resource production facilities, and then utilize the liquefaction facility to perform "zero energy," very reduced energy, or at least reduced energy LNG production using those resources. In another embodiment, the operator of the liquefaction facility may only operate one of the resource production facilities (e.g., a natural gas facility/pipeline or a nitrogen facility/pipeline) and may also operate the liquefaction facility. In such an arrangement, the value of the LNG and/or LIN produced by the liquefaction facility may offset the cost of any additional resources used in the production of the LNG and/or LIN (e.g., the cost of the natural gas and/or the cost of the nitrogen).

As another example, as described above with reference to FIGS. 1-3, the liquefaction facility may be located proximate another facility where letdown of natural gas and/or nitrogen may occur as part of the operation of the other facility. As described with reference to FIGS. 2 and 3, a portion of the nitrogen used during the production of the LNG and/or LIN may be vented to the atmosphere. However, in some embodiments, the liquefaction facility may be configured in an alternative configuration to produce some LIN. In this example, the proposed configuration may include a vent to provide at least a portion of the nitrogen to the atmosphere, and in an alternative configuration determined by the electronic device 420, the vent may be omitted and/or replaced by an outlet to provide medium pressure natural gas or nitrogen to a customer.

In an embodiment, determining a configuration of the liquefaction facility may be based, at least in part, on footprint data. For example, the electronic device 420 may determine a first footprint and a second footprint. The first footprint may indicate or correspond to an area occupied by one or more components of the liquefaction facility when configured according to the proposed configuration, and the second footprint may indicate or correspond to an area occupied by one or more components of the liquefaction facility according to the alternative configuration. In addition to area, the electronic device 420 may determine a shape of the footprint which satisfies the threshold shape of a candidate location. The electronic device 420 may determine whether at least one of the first footprint and the second footprint satisfies a threshold area and/or shape for each of the one or more candidate locations (e.g., locations for the liquefaction facility proposed in the request 402 or dynamically determined/identified by the electronic device 420).

In an embodiment, a threshold area may be determined for each of the one or more candidate locations, and may be determined based on available space at each of the one or more candidate locations. In an embodiment, the available space at each of the one or more candidate locations may be determined based on a configuration of existing components, proposed components, or a combination thereof, at each of the one or more candidate locations. In an embodiment, the configuration of the existing components, proposed components, or a combination thereof, at each of the one or more candidate locations may be determined by the electronic device 420 based on information stored at the database 440, such as the production facility configuration data 448. In an embodiment, the production facility configuration data 448 may include schematic data representative of a layout of one or more production facilities, such as the facility 108 of FIG. 1, the facility 208 of FIG. 2, and/or the facility 308 of FIG. 3. The electronic device 420 may utilize the production facility configuration data 448 to identify the available space at each of the one or more candidate locations, such as by analyzing the schematic data to identify potential locations for the liquefaction facility, which may include locations external to, adjacent to, or within the interior of a particular production facility. In an embodiment, the production facility configuration data 448 may include information indicating various parameters for, and relationships between one or more components of a production facility. For example, particular components may be required to be located a threshold distance away from other components for safety purposes, and the production facility configuration data 448 may include data representative of such parameters and relationships. Similarly, the database 440 may store liquefaction facility configuration data 450 that includes data representative of various configurations and arrangements of components used to construct a liquefaction facility according to embodiments of the present disclosure.

In an embodiment, the electronic device 420 may identify correlations between the proposed or alternative configurations of the liquefaction facility and a facility corresponding to one of the candidate locations. For example, as explained above with respect to FIGS. 1-3, the liquefaction facility may include a cycle compressor. The electronic device 420 may analyze the production facility configuration data 448 for each candidate location to determine whether a cycle compressor is present at one or more of the candidate locations, and, if a cycle compressor is present, may then determine whether there is available space within a threshold distance of the cycle compressor at each of the one or more candidate locations. In this manner, the electronic device 420 may prioritize candidate locations associated with the lowest CAPEX for constructing the liquefaction facility. It is noted that the electronic device 420 may further use the production facility configuration data 448 and the liquefaction facility configuration data 450 to identify correlations between other components of the liquefaction facility and any facilities located at the one or more candidate locations. If the electronic device 420 determines that there is available space within the threshold distance of the existing components, the electronic device 420 may determine whether there is available space at another location at or near the facility where a component could be added to construct the liquefaction facility. For example, if the facility includes a cycle compressor, but space for providing the remaining components needed to construct the liquefaction facility is not available within the threshold distance, the electronic device 420 may determine whether available space can be located at another location within the production facility, or adjacent/near the production facility such that all components of the liquefaction facility can be provided access to the resources utilized by the liquefaction facility to produce the LNG and/or the LIN.

In some embodiments, the database 440 may include data representative of the size and/or dimensions of various components of the production and liquefaction facilities, such as footprint data 454. In an embodiment, the footprint data 454 may be used to determine the footprints of the liquefaction facility according to the proposed configuration and one or more alternative configurations, and may also be used to determine the available space at each of the one or more candidate locations. For example, the production facility configuration data 448 and the liquefaction facility configuration data 450 may be used to identify components of the existing and liquefaction facilities, and the footprint data 454 may be used to estimate the size and/or space occupied by the components of the respective facilities as specified by the production facility configuration data 448 and the liquefaction facility configuration data 450.

In an embodiment, determining whether the footprints of the proposed and/or alternative configurations satisfy the threshold area for each of the one or more candidate locations may include determining whether an area associated with each of the footprints is less than or equal to the available space at each of the one or more candidate locations. This may indicate that the components required to construct the liquefaction facility will fit in the available space at the particular candidate location. In an embodiment, if the electronic device 420 determines that a footprint for a configuration of the liquefaction facility (e.g., either the proposed configuration or an alternative configuration) does not satisfy the threshold area, the electronic device 420 may alter an arrangement of the plurality of components of the liquefaction facility to produce the alternative configuration. In an embodiment, altering the configuration may include omitting one or more components, modifying a layout of the one or more components (which may include adding additional lines to supply a resource to one or more of the components), modifying a size of the one or more components (e.g., decreasing a size of a component, such as a cycle compressor), or other modifications. Additional aspects of determining alternate configurations of a liquefaction facility using footprint data according to embodiments are described with reference to FIGS. 7A-7E below.

The electronic device 420 may be configured to generate a report 404, and to send the report 404 to the client device 410 or store the report 404 at the database 440. The report 404 may include all or a portion of the information described above. For example, the report 404 may include information representative of the CAPEX and OPEX for each of the proposed and alternative configurations of the liquefaction facility, and information representative of a difference between the CAPEX and the OPEX of the proposed configuration relative to the CAPEX and the OPEX of each of the alternative configuration, where the CAPEX and OPEX for each of the alternative configurations will be lower than the CAPEX and OPEX for the proposed configuration. Additionally, the report 404 may identify the components from the proposed configuration that have been omitted in each of the alternative configurations. The report 404 may include information indicating the alternative locations for the liquefaction facility, and may include information indicating how soon production of LNG and/or LIN could begin if the liquefaction facility is constructed according to each of the configurations. Other information determined by the electronic device 420, as described elsewhere herein, may also be included in the report 404, such as the scheduling information, risk analysis information, map information, carbon dioxide emissions information, etc.

Additionally, it is noted that, although the operations described above are based on information included in the request 402 received from the client device 410 via the network 460, other methods of receiving the information indicating the proposed configuration of the liquefaction facility may be used. For example, the information may be provided to the electronic device 420 using the I/O device 426, as indicated by the request 434.

The report 404, whether generated in response to the request 402 or the request 434, may enable an entity to better evaluate the financial risk associated with construction of a liquefaction facility, and to reduce the financial risk by constructing the liquefaction facility according to the alternative configuration. Additionally, as explained above, constructing the liquefaction facility according to the alternative configuration may increase the operational reliability and the safety of the liquefaction facility.

Figure 5:
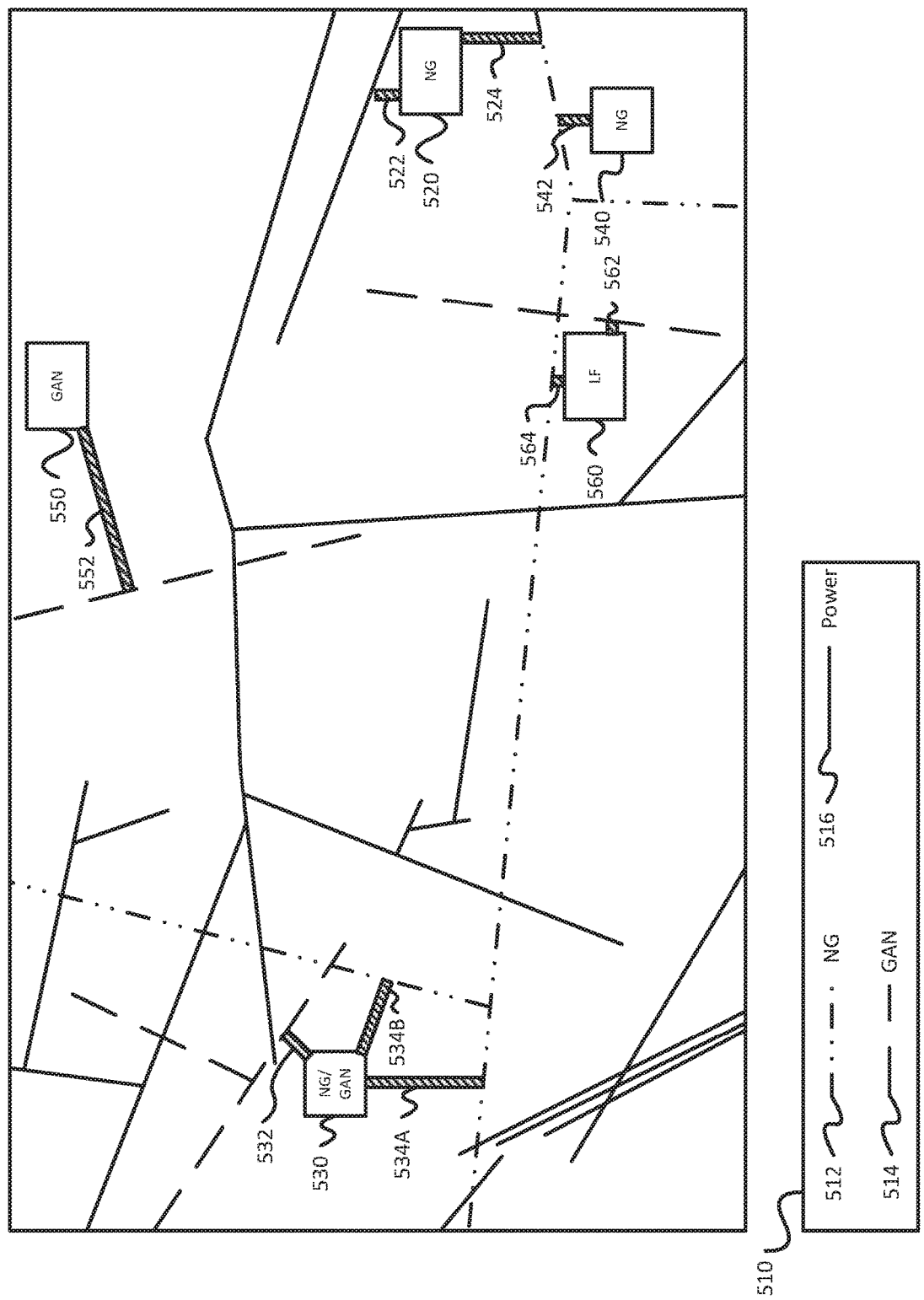
FIG. 5 is a block diagram illustrating techniques for determining a configuration of a liquefaction facility according to embodiments.

Referring to FIG. 5, a block diagram illustrating techniques for determining a configuration of a liquefaction facility according to embodiments is shown. In FIG. 5, a plurality of pipelines and a plurality of candidate locations are shown. As indicated by the legend 510, the plurality of pipelines includes natural gas pipelines 512, nitrogen pipelines 514, and power pipelines 516. The natural gas pipelines 512 may be used to transport natural gas from a production facility to a remote location, such as a production facility or other type of facility (e.g., a methanol plant). In FIG. 5, a plurality of facilities is shown. The plurality of facilities includes first production facility 520, a second production facility 530, a natural gas production facility 540, and a nitrogen production facility 550. The natural gas production facility 540 may supply natural gas to the natural gas pipeline 512 using pipeline supply line 542, and the nitrogen production facility 550 may supply nitrogen to the nitrogen pipeline 514 using pipeline supply line 552.

The first production facility 520 may correspond to a production facility that utilizes natural gas during its daily operations, and the second production facility 530 may correspond to a production facility that utilizes both natural gas and nitrogen as part of its daily operations. Accordingly, the first production facility 520 may include a tie-in line 524 that provides the first production facility 520 with access to natural gas from the natural gas pipeline 512, and the second production facility 530 may include tie-in lines 532 and 534B that provide the second production facility 530 with access to nitrogen from the nitrogen pipeline 514 and natural gas from the natural gas pipeline 512, respectively. It is noted that the pipelines shown in FIG. 5 are provided for purposes of illustration, rather than by way of limitation, and that other pipelines carrying other resources may be accounted for during operations for determining alternative configurations and locations for a liquefaction facility according to embodiments of the present disclosure. For example, as described above, the other resources may include sources for feedstock and/or sources for other resources, such as other industrial gases, water pipelines, air pipelines, etc.

In an embodiment, a request may be received at an electronic device, such as the electronic device 420 of FIG. 4. In an embodiment, the request may correspond to the request 402 of FIG. 4, and may indicate that the second production facility 530 has been identified as a proposed location for construction of a liquefaction facility for producing LNG and/or LIN. In an embodiment, the second production facility 530 may have been chosen as the proposed location because the second production facility 530 has access to both nitrogen and natural gas via the tie-in lines 532 and 534B, respectively.

In response to receiving the request, the electronic device may initiate operations to determine whether the liquefaction facility should be constructed at the second production facility 530, or an alternative location, such as the first production facility 520. In an embodiment, the electronic device may determine that the liquefaction facility may be provided at the second production facility 530, but that available space near the tie-in line 534B is not sufficient to construct the liquefaction facility, and may propose constructing a second tie-in line 534A to provide the liquefaction facility with access to the natural gas supplied by the natural gas pipeline 512. Additionally, the electronic device may identify the first production facility 520 as an alternative location for the liquefaction facility (e.g., because the first production facility includes available space for constructing the liquefaction facility), and that a tie-in line 522 needs to be constructed to provide the liquefaction facility with access to nitrogen from the nitrogen pipeline 514. In an embodiment, the electronic device may utilize facility configuration data (e.g., the production facility configuration data 448 and the liquefaction facility configuration data 450 of FIG. 4) and footprint data (e.g., the footprint data 454 of FIG. 4) to determine whether there is available space for constructing the liquefaction facility at the first production facility 520 and the second production facility 530, as described above with reference to FIG. 4.

In an embodiment, the electronic device may calculate a CAPEX for constructing the liquefaction facility at each of candidate locations (e.g., the first production facility 520 and the second production facility 530). In an embodiment, the CAPEX may be calculated based, at least in part, on whether one or more components of the liquefaction facility are present at one of the candidate locations, and whether space is available for providing the liquefaction facility in proximity to the existing components. For example, as explained above, the second production facility 530 includes the tie-in line 534B, but that tie-in line is not suitable for providing natural gas to the liquefaction facility (e.g., because space is not available for constructing the liquefaction facility in proximity to the tie-in line 534B), and therefore, the tie-in line 534A needs to be constructed, which may increase the CAPEX associated with constructing the liquefaction facility at the second production facility 530. Additionally, the electronic device may determine the CAPEX for constructing the liquefaction facility at the first production facility 520, which may account for costs associated with constructing the tie-in line 522 for providing nitrogen to the liquefaction facility.

In an embodiment, the electronic device may determine a second alternative configuration for providing the liquefaction facility at the first production facility 520, where the second alternative configuration does not include use of nitrogen during the production of the LNG and/or LIN. In this alternative configuration, additional components may be added to the configuration of the liquefaction facility, such as compressors and the like, to facilitate the production of the LNG and/or LIN. The electronic device may determine a CAPEX for this second alternative configuration as well.

In an embodiment, the electronic device may further identify a third candidate location for constructing the liquefaction facility, such as the candidate location 560. As shown in FIG. 5, the candidate location 560 may be a location that is in close proximity to the natural gas pipeline 512 and the nitrogen pipeline 514. In an embodiment, the CAPEX associated with third candidate location 560 may be calculated, which may reflect costs to provide tie-in lines 562 and 564 for providing the third candidate location with access to the nitrogen pipeline 514 and the natural gas pipeline 512, respectively. It is noted that the electronic device may identify additional candidate locations for constructing the liquefaction facility, and that the exemplary locations described with reference to FIG. 5 are provided for purposes of illustration, rather than by way of limitation.

In an embodiment, the electronic device may further determine whether production of a resource may be increased based on construction of the liquefaction facility. For example, if the liquefaction facility is constructed to utilize nitrogen during the production of LNG and/or LIN, both the natural gas production facility 540, and the nitrogen production facility 550 may increase production/compression to provide an amount of resources (e.g., natural gas and nitrogen, respectively) to the respective pipelines to account for the production of the LNG and/or LIN at the liquefaction facility. It is noted that since the letdown natural gas provides refrigeration at a warm end and the letdown nitrogen provides refrigeration at a cold end, the energy (flows and pressure ratios) of nitrogen and natural gas should optimally be in similar ratios to each other (e.g., if the available natural gas letdown energy is very high, ideally the nitrogen expansion energy should also be high in order to fully capitalize on the available natural gas expansion energy to make LNG and/or LIN). In an embodiment, the electronic device may estimate the increases in production of one or more resources utilized by the liquefaction facility based on the various configurations of the liquefaction facility, and demand information. In an embodiment, the electronic device may further estimate an OPEX for each configuration of the liquefaction facility, as described above with reference to FIG. 4. In an embodiment, the OPEX for each configuration may account for any power provided to the liquefaction facility by the power pipelines 516. The power costs may be estimated based on a desired rate of production for the liquefaction facility, power consumption data associated with the operation of the liquefaction facility, and historical pricing data associated with power provided by the power pipelines 516.

In an aspect, the electronic device may generate a map illustrating the proposed location and the one or more identified alternative locations for the liquefaction facility, and may identify geographic coordinates/boundaries for the liquefaction facility. The map may also identify the resources available to each of the locations and may indicate, for each of the locations, a length of a shortest pipeline to each available resource, and a direction from each of the locations to the nearest available resource pipeline. The map may further indicate whether pipelines for any of the locations require booster compressors to provide adequate delivery pressure for the resources provided by the pipelines. In an additional or alternative aspect, the electronic device may determine the alternative locations for the liquefaction facility by locating alternative sources for feedstock for the liquefaction facility, or by determining whether an alternative source for feedstock is accessible from a proposed location for the liquefaction facility.

In an embodiment, a report may be generated by the electronic device that provides details regarding each of the candidate locations, each of the various configurations of the liquefaction facility, which may include different configurations for a single candidate location, information indicating the CAPEX and OPEX for the different candidate locations and configurations, the map, and other information relevant to the construction of the liquefaction facility.

In an embodiment, the report may include rankings for the various candidate locations and liquefaction facility configurations. For example, the report may rank the candidate locations and liquefaction facility configurations based on CAPEX, OPEX, production capability (e.g., some locations may facilitate larger liquefaction facilities than others), emissions reduction, resource production increases (e.g., locations that enable an upstream resource production facility, such as the natural gas production facility 540 or the nitrogen production facility 550, to increase production may be ranked higher than locations and configurations that do not allow resource production increases), rate of return (IRR), other factors (e.g., access to roads, river, rail, dock, etc. to transport the LNG and/or LIN), or a combination thereof.

Figure 6:
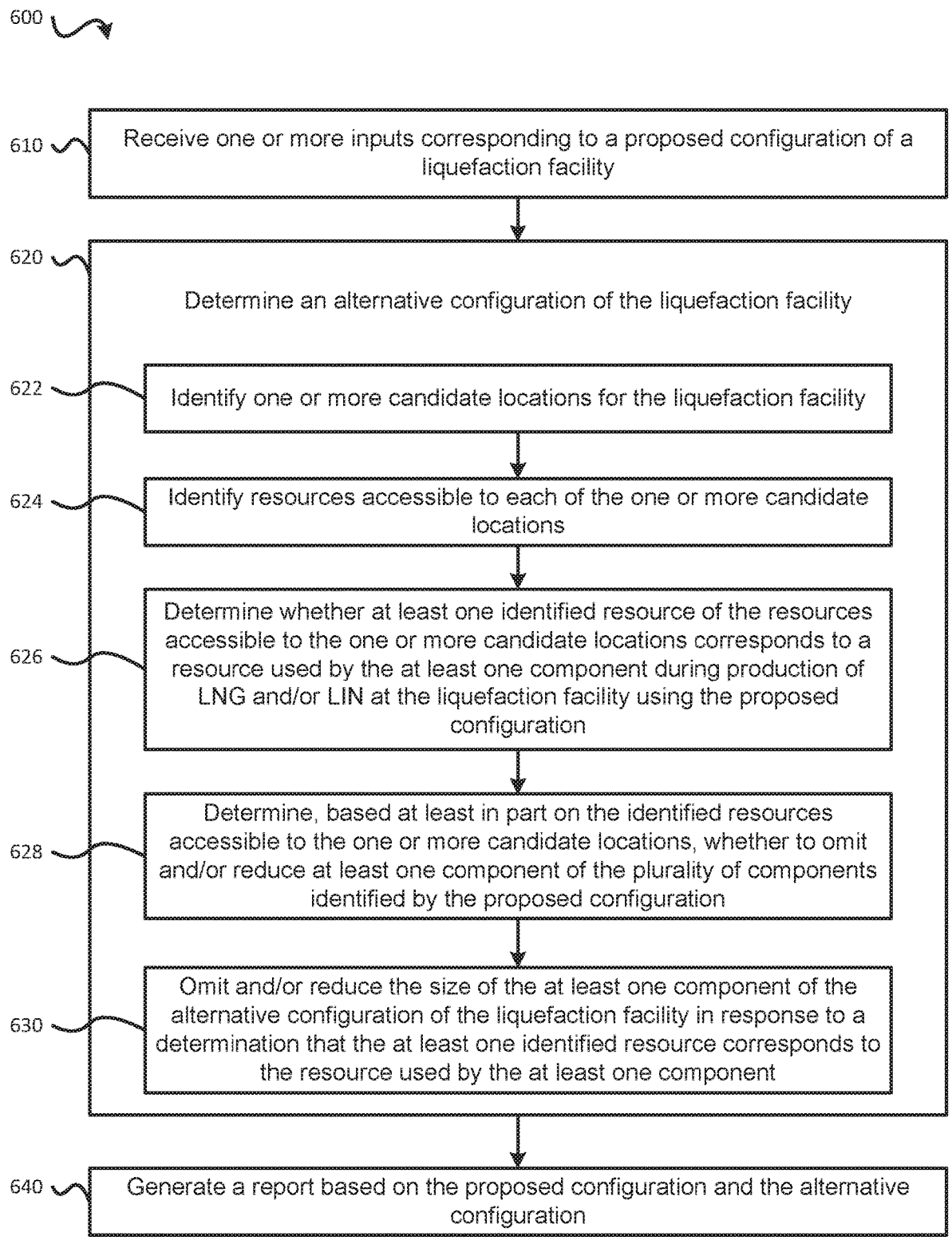
FIG. 6 is a flow diagram of an embodiment of a method for determining a configuration of a liquefaction facility according to embodiments.

Referring to FIG. 6, a flow diagram of an embodiment of a method for determining a configuration of a liquefaction facility according to embodiments is shown as a method 600. In an aspect, method 600 may be performed by the electronic device 420 (e.g., by the processor 422 executing the instructions 432 of FIG. 4). At 610, the method 600 includes receiving one or more inputs corresponding to a proposed configuration of a liquefaction facility. In an aspect, the one or more inputs may be included in the request 402 or the request 434 of FIG. 4. The proposed configuration may identify a plurality of components utilized to produce LNG (and/or LIN) at the liquefaction facility when configured according to the proposed configuration. At 620, the method 600 includes determining an alternative configuration of the liquefaction facility. The alternative configuration will most likely be different from the proposed configuration since there will likely be some integration at the site.

In an embodiment, determining the alternative configuration may include, at 622, identifying one or more candidate locations for the liquefaction facility, and, at 624, identifying resources accessible to each of the one or more candidate locations for the liquefaction facility. In an embodiment, the one or more candidate locations may be included as one or more inputs. In an embodiment, the one or more candidate locations may be determined based on data stored in a database, such as the geographic data 444 stored at the database 440 of FIG. 4. In an embodiment, the data stored at the database may include the historical price data 442 of FIG. 4, the pipeline data 446 or FIG. 4, and the production facility configuration data 448 of FIG. 1, the liquefaction facility configuration data 450 of FIG. 4, the demand data 452 of FIG. 4, the footprint data 454 of FIG. 4, or a combination thereof. The identified resources may be accessible from at least one source external to the liquefaction facility, such as a pipeline, or may be generated internally by the industrial site at the candidate location. The identified resources may be utilized to produce LNG and/or LIN at the liquefaction facility using the proposed configuration.

At 626, determining the alternative configuration may include determining whether at least one resource of the resources accessible to the proposed location corresponds to a resource which may be used during production of LNG and/or LIN at the liquefaction facility using the proposed configuration, and, at 628, determining, based at least in part on the identified resources accessible to the proposed location, whether to omit or reduce the size of at least one component of the plurality of components identified by the proposed configuration, or to reduce OPEX and/or CAPEX without omitting any components by reducing size or complexity of proposed components. In an embodiment, the plurality of components identified by the proposed configuration may the proposed configuration include a compression unit driven by one of an electrical motor, a gas fired turbine, or a steam turbine, and determining the alternative configuration may include omitting or reducing the size of the compression unit. In an embodiment, the compression unit may be a nitrogen compression unit. At 630, determining the alternative configuration may include omitting the at least one component from the alternative configuration of the liquefaction facility in response to a determination that the at least one resource corresponds to the resource used by the at least one component, or to reduce OPEX and/or CAPEX without omitting any components by reducing size or complexity of proposed components.

At 640, the method 600 includes generating a report based on the proposed configuration and one or more alternative configurations. In an aspect, the report may be the report 404 of FIG. 4. The report may include information indicating a difference between the proposed configuration and the one or more alternative configurations. Additionally, the report may include cost information representative of a difference between various costs (e.g., CAPEX, OPEX, etc.) over a period of time for each of the different configurations, and IRR information. In an embodiment, the cost information may include cost information corresponding to an amount of capital expenditure required to construct the liquefaction facility using the proposed configuration and the alternative configuration. Additionally, the cost information may include cost information corresponding to OPEX for operating the liquefaction facility configured according to the proposed configuration and the alternative configuration over a period of time.

In an embodiment, the report may further include schematic drawings for the proposed configuration and each of the alternative configurations for the liquefaction facility. In an additional or alternative embodiment, the report (or the schematic drawings) may include information representative of relationships between the various components of the liquefaction facility according to each configuration. For example, the information representative of relationships between the various components of the liquefaction facility according to each configuration may indicate distances between various components of the liquefaction facility, distances between components of the liquefaction facility relative to particular existing or proposed components at each of the one or more candidate locations, alignment of components of the liquefaction facility with respect to existing or proposed components at each of the one or more candidate locations, the footprint and/or area for each configuration of the liquefaction facility, other information, or a combination thereof. In yet another additional or alternative embodiment, the report may include information representative of different resource utilizations for each configuration of the liquefaction facility. For example, the report may indicate that the proposed configuration is estimated to consume a first amount of power, natural gas, nitrogen, etc. to produce LNG, LIN, or another liquid during a period of time, and may indicate that an alternative configuration is estimated to consume a second amount of power, natural gas, nitrogen, etc. to produce LNG, LIN, or another liquid during the same period of time, where the second amount of power is lower than the first amount of power. In an embodiment, the estimates may be based on simulations, which may be performed using simulation software installed on an electronic device, such as the electronic device 420 of FIG. 4. In an embodiment, the report may also include ranking information. The ranking information may indicate a ranking of the various configurations of the liquefaction facility according to the composite of one or more parameters, such as CAPEX, OPEX, estimated LNG and/or LIN production, another factor, or a combination thereof. For example, OPEX parameters such as power, natural gas, cooling water, etc., each have an associated cost which is converted to an equivalent CAPEX for a specified time duration. The ranking of the various configurations in the report may then include total cost (e.g. dollar per ton of LNG) as well as project IRR (internal rate of return) or equivalent.

In an embodiment, a user may review the report, and then tweak one or more of the configurations of the liquefaction facility. For example, an interactive graphical user interface (GUI) may be provided that allows the user to view a schematic for one of the various configurations overlaid on an image representative of a particular candidate location, which may allow the user to visualize how the particular configuration of the liquefaction facility will fit at the particular candidate location. The user may then fine tune the configuration of the liquefaction facility, such as to modify the location and arrangement of the one or more components of the liquefaction facility. For example, one of the alternative configurations may propose tapping into an existing or proposed high pressure nitrogen system of a candidate location at a particular access point. Using the interactive GUI, the user may modify the access point for tapping into the existing or proposed high pressure nitrogen system of the candidate location, such as to relocate the access point to another point or location, or using multiple access points to tap into the existing or proposed fire safety system of the candidate location. As another example, a particular alternative configuration may propose a first size for the cycle compressor, but the user may modify the particular alternative configuration to increase or decrease the size of or omit the cycle compressor. In an embodiment, the simulations may be rerun based on any modifications made by the user via the interactive GUI, and the report may be regenerated, which may include updating the schematic drawings for the modified configuration(s), updating the information representative of relationships between the various components of the liquefaction facility for the modified configuration(s), updating the information representative of different resource utilizations for the modified configuration(s), re-ranking the various configurations based on the changes made by the user, or a combination thereof. Allowing a user to "fine tune" the various configurations determined according to embodiments herein may improve one or more aspects of the liquefaction facility, (e.g., optimizing tie-in line and access point locations, streamlining the layout or arrangement of one or more components of the liquefaction facility, etc., improving fire safety system coverage, optimizing the size of particular components of the liquefaction facility, and the like).

Using the method 600 to configure a liquefaction facility may increase the operational reliability and the safety of the liquefaction facility, and may enable an entity to better evaluate the financial risk associated with construction of a liquefaction facility, and to reduce the financial risk by constructing the liquefaction facility according to the alternative configuration. Further, constructing a liquefaction facility according to the method 600 may enable other facilities to be operated more efficiently, such as by allowing a resource production facility to be operated at more operationally efficient levels (e.g., increased resource output and reduced emissions).

Referring to FIG. 7A, a block diagram illustrating a composition of components at a candidate location for a proposed liquefaction facility according to embodiments is shown as a candidate location 700. In FIG. 7A, the candidate location includes a plurality of components shown as various shapes (e.g., rectangles and circles) having solid lines. As shown in FIG. 7A, the candidate location 700 may include available areas 710 and 720, which may correspond to spaces at the candidate location 700 that may be suitable for providing a liquefaction facility. In an embodiment, the available areas 710, 720 may have been identified by an electronic device, such as the electronic device 420 described above with reference to FIG. 4. The electronic device may be configured to determine whether a footprint for a proposed configuration of the liquefaction facility satisfies the available area 710 and/or the available area 720. Additionally, as indicated by legend 702 of FIG. 7A, the candidate location 700 may include infrastructure 704 associated with utilities systems and infrastructure 706 associated with safety and hazard systems. When determining the location for the liquefaction facility, the electronic device may be configured to determine points of integration for the liquefaction facility to tie-in to the infrastructure 704 and the infrastructure 706.

For example, FIG. 7B is a block diagram illustrating a footprint of an available area at a candidate location and a footprint of a liquefaction facility according to a proposed configuration according to embodiments. In FIG. 7B, a footprint 730 corresponding to the proposed configuration of the liquefaction facility is shown. As shown in FIG. 7B, the footprint 730 may be larger than the available area 720. In such instances, the electronic device may determine an alternate configuration for the liquefaction facility, where the footprint 730 of the liquefaction facility is reduced in the alternative configuration. For example, FIG. 7C is a block diagram illustrating a footprint of an available area at a candidate location and a footprint of a liquefaction facility according to an alternative configuration according to embodiments is shown. As shown in FIG. 7C, an alternative footprint 730A for the liquefaction facility may be equal to or smaller than the available area 720. Thus, when the liquefaction facility is configured according to the alternative configuration, liquefaction facility may be provided at the candidate location 700 (e.g., at the available area 720).

As another example, FIG. 7D is a block diagram illustrating a footprint of an available area at a candidate location and a footprint of a liquefaction facility according to a proposed configuration according to embodiments. In FIG. 7D, the footprint 730 corresponding to the proposed configuration of the liquefaction facility is shown. As shown in FIG. 7D, the footprint 730 may be larger than the available area 710. In such instances, the electronic device may determine an alternate configuration for the liquefaction facility, where the footprint 730 of the liquefaction facility is reduced in the alternative configuration. For example, in FIG. 7E a block diagram illustrating a footprint of an available area at a candidate location and a footprint of a liquefaction facility according to an alternative configuration according to embodiments is shown. As shown in FIG. 7E, an alternative footprint 730B for the liquefaction facility may be equal to or smaller than the available area 710. Thus, when the liquefaction facility is configured according to the alternative configuration, liquefaction facility may be provided at the candidate location 700 (e.g., at the available area 710).

In an embodiment, the different footprints of the alternative configurations (e.g., the footprints 730A and 730B) may be different. For instance, the alternative configuration corresponding to the footprint 730A may be smaller than the alternative configuration corresponding to the footprint 730B. This may occur, for example, when one or more components of the liquefaction facility are omitted in one alternative configuration relative to the proposed configuration and/or other alternative configurations, such as by omitting one or more compressors (e.g., when nitrogen is available to produce the LNG and/or LIN). This may also occur, for example, when components are added in one alternative configuration relative to the proposed configuration and/or other alternative configurations, such as to include additional components, such as an additional turbine to produce additional product or additional liquid storage and loading systems, to produce LIN or for other reasons. In an additional or alternative embodiment, the different footprints may be generated by rearranging components and/or connections of the components of the liquefaction facility and/or components of the existing or proposed industrial facility.

In an embodiment, a shape of the proposed and alternative configurations and/or available space may be accounted for. For example, the particular arrangement of the components of the liquefaction facility may cause the footprint of the proposed or alternative configuration(s) to have an initial shape, and the available space may also have a particular shape depending on the particular arrangement of existing or proposed components at a candidate location for the liquefaction facility. Embodiments may determine whether the shape and/or area of the footprint for the available space are suitable for the area and shape of the footprint for a particular configuration of the liquefaction facility.

It is appreciated that the illustrative aspects described herein may be implemented separately or in combination. Additionally, it is noted that one or more steps in the exemplary method may be implemented in a differing order or omitted all together. It is noted that the functional blocks, modules and processes illustrated in FIG. 6 may include or utilize processors (e.g., the processors 422 of FIG. 4), electronics devices (e.g., the electronic device 420 of FIG. 4), hardware devices, electronics components, logical circuits, memories, software codes, firmware codes, etc., or any combination thereof.

Those of skill would further appreciate that the various illustrative logical blocks, modules, circuits, and algorithm steps described in connection with the present disclosure may be implemented as electronic hardware, computer software (e.g., the instructions 432 of FIG. 4, respectively), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system (e.g., the system 400 of FIG. 4). Skilled artisans may implement the described functionality in varying ways for each particular application, but such implementation decisions should not be interpreted as causing a departure from the scope of the present disclosure.

Additionally, the various illustrative logical blocks, modules, and circuits described in connection with the present disclosure may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step or reversed in order.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

What is claimed is:

1. A method comprising:
   receiving one or more inputs corresponding to a proposed configuration of a liquefaction facility, wherein the proposed configuration identifies a plurality of components utilized to produce liquefied natural gas (LNG) and/or liquid nitrogen (LIN) at the liquefaction facility when configured according to the proposed configuration;
   determining an alternative configuration of the liquefaction facility, wherein the alternative configuration is different from the proposed configuration, and wherein determining the alternative configuration includes:
   identifying one or more candidate locations for the liquefaction facility;
   identifying resources accessible to each of the one or more candidate locations, wherein the identified resources are accessible from at least one source external to the liquefaction facility, and wherein the identified resources are utilized by the liquefaction facility to produce the LNG and/or the LIN;
   determining whether at least one identified resource of the resources accessible to the one or more candidate locations corresponds to a resource used during production of the LNG and/or the LIN at the liquefaction facility using the proposed configuration; and
   determining, based at least in part on the identified resources accessible to the one or more candidate locations, whether to omit or reduce a size of at least one component of the plurality of components identified by the proposed configuration; and omitting or reducing the size of the at least one component of the alternative configuration of the liquefaction facility in response to a determination that the at least one identified resource corresponds to the resource generated by the at least one component;

generating a report based on the proposed configuration and the alternative configuration, wherein the report includes information indicating a difference between the proposed configuration and the alternative configuration; and constructing the liquefaction facility according to the alternative configuration included in the report, wherein the liquefaction facility constructed according to the alternative configuration is configured to provide refrigeration capacity for producing the LNG and/or the LIN via letdown of one or more resources accessible to a location of the liquefaction facility, and wherein at least a portion of the resources letdown by the liquefaction facility is provided to a facility external to the liquefaction facility at a pressure that is lower than a pressure for which the resources are available to the external facility via other sources.

2. The method of claim 1, wherein the resources accessible to the one or more candidate locations include one or more of natural gas, nitrogen, other industrial gases, or a combination thereof, and wherein each of the resources accessible to the one or more candidate locations are within a threshold distance of each of the one or more candidate locations.

3. The method of claim 2, wherein the one or more of the natural gas, the nitrogen, the other industrial gas, or the combination thereof are provided to the liquefaction facility from the at least one source at a pressure greater than 15 bara.

4. The method of claim 1, wherein the proposed configuration comprises a compression unit driven by one of an electrical motor, a gas fired turbine, or a steam turbine, and wherein determining the alternative configuration further comprises omitting or reducing the size of the compression unit.

5. The method of claim 4, wherein the compression unit is a nitrogen compression unit.

6. The method of claim 1, wherein identifying the resources accessible to each of the one or more candidate locations further comprises:

identifying one or more sources for a plurality of resources;

calculating, for each of the one or more candidate locations, a distance between a particular candidate location of the one or more candidate locations and each of the one or more sources; and determining, for each of the one or more candidate locations, whether the distance between the particular candidate location and each of the one or more sources satisfies a threshold distance, wherein the resources accessible to the particular candidate location correspond to resources associated with particular sources that are within the threshold distance of the particular candidate location.

7. The method of claim 6, wherein the threshold distance is ten kilometers.

8. The method of claim 6, wherein the threshold distance is two kilometers.

9. The method of claim 6, wherein the threshold distance is one kilometer.

10. The method of claim 6, wherein the one or more sources include pipelines, production facilities, or both.

11. The method of claim 1, the method further comprising:

determining a first footprint and a second footprint, wherein the first footprint indicates an area and/or shape occupied by one or more components of the liquefaction facility according to the proposed configuration, and wherein the second footprint indicates an area and/or shape occupied by one or more components of the liquefaction facility according to the alternative configuration;

determining a threshold area for each of the one or more candidate locations based on an area and/or shape of available space at each of the one or more candidate locations, the area and/or shape of the available space at each of the one or more candidate locations determined based on a configuration of existing components, proposed components, or a combination thereof, at each of the one or more candidate locations; and determining whether at least one of the first footprint and the second footprint satisfies a threshold area and/or shape of the available space at each of the one or more candidate locations.

12. The method of claim 11, wherein determining whether at least one of the first footprint and the second footprint satisfies the threshold area and/or shape of the available space at each of the one or more candidate locations comprises:

determining whether the area and/or shape of the first footprint is less than or equal to the threshold area and/or shape of the available space at each of the one or more candidate locations; and determining whether the area and/or shape of the second footprint is less than or equal to the threshold area and/or shape of the available space at each of the one or more candidate locations.

13. The method of claim 11, further comprising altering an arrangement of the plurality of components of the liquefaction facility to produce the alternative configuration in response to a determination that the area and/or shape of the first footprint is greater than the threshold area and/or shape of the available space at one of the one or more candidate locations.

14. The method of claim 1, further comprising identifying one or more access points, each of the one or more access points corresponding to a location for providing a tie-in line to provide access to the at least one identified resource to the liquefaction facility, wherein each of the one or more candidate locations is identified as a location that provides an access point to at least one of the identified resources.

15. The method of claim 14, further comprising estimating a cost to construct the one or more tie-in lines to provide the access points to the one or more of the identified resources, wherein the report includes cost information representative of cost to construct the one or more tie-in lines.

16. An apparatus comprising:

a processor; and a memory coupled to the processor, the memory storing instructions that, when executed by the processor, cause the processor to perform operations comprising:

receiving one or more inputs corresponding to a proposed configuration of a liquefaction facility, wherein the proposed configuration identifies a plurality of components utilized to produce liquefied natural gas (LNG) and/or liquid nitrogen (LIN) at the liquefaction facility when configured according to the proposed configuration;

determining an alternative configuration of the liquefaction facility, wherein the alternative configuration is different from the proposed configuration, and wherein determining the alternative configuration includes:

identifying one or more candidate locations for the liquefaction facility;

identifying resources accessible to each of the one or more candidate locations, wherein the identified resources are accessible from at least one source external to the liquefaction facility, and wherein the identified resources are utilized by the liquefaction facility to produce the LNG and/or the LIN;

determining whether at least one identified resource of the resources accessible to the one or more candidate locations corresponds to a resource used by the at least one component during production of the LNG and/or the LIN at the liquefaction facility using the proposed configuration; and determining, based at least in part on the identified resources accessible to the one or more candidate locations, whether to omit or reduce a size of at least one component of the plurality of components identified by the proposed configuration; and omitting or reducing the size of the at least one component of the alternative configuration of the liquefaction facility in response to a determination that the at least one identified resource corresponds to the resource generated by the at least one component;

generating a schematic drawing for the proposed configuration of the liquefaction facility and a schematic drawing for the alternative configuration of the liquefaction facility, wherein the schematic drawing for the alternative configuration of the liquefaction facility comprises one or more components configured to provide refrigeration capacity for producing the LNG and/or the LIN via letdown of resources accessible to a particular candidate location for the alternative configuration of the liquefaction facility and one or more components configured to provide at least a portion of the letdown resources to an a facility external to the liquefaction facility of the alternative configuration; and generating a report based on the proposed configuration and the alternative configuration, wherein the report includes the schematic drawing for the proposed configuration and the schematic drawing for the alternative configuration.

17. The apparatus of claim 16, wherein the resources accessible to the one or more candidate locations include natural gas, nitrogen, another industrial gas, or a combination thereof, and wherein the at least one source external to the liquefaction facility includes at least one pipeline.

18. The apparatus of claim 16, the operations further comprising:

identifying one or more facilities that supply the resources to the at least one pipeline;

determining a demand for the resources downstream of the one or more facilities that supply the resources to the at least one pipeline;

determining, based on the demand, whether production of the resources by the one or more facilities can be increased; and in response to a determination that production of the resources by at least one of the one or more facilities can be increased, initiating operations to increase production of the resources by at least the one of the or more facilities, wherein additional amounts of the resources produced in response to the operations to increase the production are provided to the pipeline, and wherein the additional amounts of the resources are utilized by the liquefaction facility to produce the LNG and/or the LIN.

19. The apparatus of claim 18, the operations further comprising identifying one or more additional candidate locations in response to a determination that production of the resources by at least one of the one or more facilities cannot be increased, wherein each of the one or more additional candidate locations correspond to locations where the identified resources are accessible, and wherein facilities that provide the identified resources to the one or more additional candidate locations can increase production of the identified resources to produce additional amounts of the resources for use by the liquefaction facility to produce the LNG and/or LIN.

20. The apparatus of claim 16, the operations further comprising:

determining a first footprint and a second footprint, wherein the first footprint indicates an area occupied by one or more components of the liquefaction facility according to the proposed configuration, and wherein the second footprint indicates an area occupied by one or more components of the liquefaction facility according to the alternative configuration;

determining a threshold area for each of the one or more candidate locations based on available space and shape at each of the one or more candidate locations, the available space at each of the one or more candidate locations determined based on a configuration of existing components, proposed components, or a combination thereof, at each of the one or more candidate locations; and determining whether at least one of the first footprint and the second footprint satisfies the threshold area and shape for each of the one or more candidate locations.

21. The apparatus of claim 20, the operations further comprising altering an arrangement of the plurality of components of the liquefaction facility to produce the alternative configuration in response to a determination that the area associated with the first footprint is greater than the available space at one of the one or more candidate locations.

22. The apparatus of claim 21, the operations further comprising identifying one or more access points, each of the one or more access points corresponding to a location for providing a tie-in line to provide access to the at least one identified resource to the liquefaction facility, wherein each of the one or more candidate locations is identified as a location that provides an access point to at least one of the identified resources.

23. A non-transitory computer-readable storage medium storing instructions that, when executed by at least one processor, cause the at least one processor to perform operations comprising:

receiving one or more inputs corresponding to a proposed configuration of a liquefaction facility, wherein the proposed configuration identifies a plurality of components utilized to produce liquefied natural gas (LNG)

and/or liquid nitrogen (LIN) at the liquefaction facility when configured according to the proposed configuration;

determining an alternative configuration of the liquefaction facility, wherein the alternative configuration is different from the proposed configuration, and wherein determining the alternative configuration includes:

identifying one or more candidate locations for the liquefaction facility;

identifying resources accessible to each of the one or more candidate locations, wherein the identified resources are accessible from at least one source external to the liquefaction facility, and wherein the identified resources are utilized by the liquefaction facility to produce the LNG and/or the LIN;

determining whether at least one identified resource of the resources accessible to the one or more candidate locations corresponds to a resource used during production of the LNG and/or the LIN at the liquefaction facility using the proposed configuration; and determining, based at least in part on the identified resources accessible to the one or more candidate locations, whether to omit or reduce a size of at least one component of the plurality of components identified by the proposed configuration; and omitting or reducing the size of the at least one component of the alternative configuration of the liquefaction facility in response to a determination that the at least one identified resource corresponds to the resource generated by the at least one component;

generating a schematic drawing for the proposed configuration of the liquefaction facility and a schematic drawing for the alternative configuration of the liquefaction facility, wherein the schematic drawing for the alternative configuration of the liquefaction facility comprises one or more components configured to provide refrigeration capacity for producing the LNG and/or the LIN via letdown of resources accessible to a particular candidate location for the alternative configuration of the liquefaction facility and one or more components configured to provide at least a portion of the letdown resources to an a facility external to the liquefaction facility of the alternative configuration; and generating a report based on the proposed configuration and the alternative configuration, wherein the report includes the schematic drawing for the proposed configuration and the schematic drawing for the alternative configuration.

24. The non-transitory computer-readable storage medium of claim 23, wherein the resources accessible to the one or more candidate locations include natural gas, nitrogen, or both, and wherein the at least one source external to the liquefaction facility includes at least one pipeline.

25. The non-transitory computer-readable storage medium of claim 24, the operations further comprising:

identifying one or more facilities that supply the resources to the at least one pipeline;

determining a demand for the resources downstream of the one or more facilities that supply the resources to the at least one pipeline;

determining, based on the demand, whether production of the resources by the one or more facilities can be increased based on estimated production of the LNG and/or the LIN according to the alternative configuration of the liquefaction;

in response to a determination that production of the resources by at least one of the one or more facilities can be increased, initiating operations to increase production of the resources by at least the one of the or more facilities, wherein additional amounts of the resources produced in response to the operations to increase the production are provided to the pipeline, and wherein the additional amounts of the resources are utilized by the liquefaction facility to produce the LNG and/or the LIN; and in response to a determination that production of the resources by at least one of the one or more facilities cannot be increased, identifying one or more additional candidate locations, wherein each of the one or more additional candidate locations correspond to locations where the identified resources are accessible, and wherein facilities that provide the identified resources to the one or more additional candidate location can increase production of the identified resources to produce additional amounts of the resources for use by the liquefaction facility to produce the LNG and/or the LIN.

26. The non-transitory computer-readable storage medium of claim 23, the operations further comprising:

determining a first footprint and a second footprint, wherein the first footprint indicates an area and shape occupied by one or more components of the liquefaction facility according to the proposed configuration, and wherein the second footprint indicates an area and shape occupied by one or more components of the liquefaction facility according to the alternative configuration;

determining a threshold area and/or shape for each of the one or more candidate locations based on available space and shape at each of the one or more candidate locations, the available space at each of the one or more candidate locations determined based on a configuration of existing components, proposed components, or a combination thereof, at each of the one or more candidate locations;

determining whether at least one of the first footprint and the second footprint satisfies the threshold area and/or shape for each of the one or more candidate locations; and altering an arrangement of the plurality of components of the liquefaction facility to produce the alternative configuration in response to a determination that the area and/or shape associated with the first footprint is greater than the available space and/or shape at one of the one or more candidate locations.

27. The non-transitory computer-readable storage medium of claim 23, the operations further comprising determining whether one or more of the plurality of components of the proposed configuration are present or proposed at particular locations corresponding to the one or more candidate locations, wherein the at least one component omitted from the alternative configuration corresponds to at least one the one or more components of the proposed configuration that are present or proposed at the particular locations.

28. The non-transitory computer-readable storage medium of claim 23, the operations further comprising at least one of:

generating schematic drawings for each configuration of the liquefaction facility;

determining relationship information for each configuration of the liquefaction facility, wherein the relationship information is representative of relationships between components of the liquefaction facility for each configuration of the liquefaction facility, and wherein the relationship information is included in the report;

calculating resource utilizations for each configuration of the liquefaction facility;

ranking the configurations of the liquefaction facility according to a composite of one or more ranking parameters, wherein the report comprises at least one of the schematic drawings, the relationship information, the information representative of the resource utilizations, and the rankings; and providing an interactive graphical user interface configured to receive inputs from a user, wherein the inputs modify at least one configuration of the liquefaction facility.

29. The method of claim 1 further comprising the steps of:

identifying one or more facilities that supply the resources to the at least one pipeline;

determining a demand for the resources downstream of the one or more facilities that supply the resources to the at least one pipeline;

determining, based on the demand, whether production of the resources by the one or more facilities can be increased based on estimated production of the LNG and/or the LIN according to the alternative configuration of the liquefaction; and in response to a determination that production of the resources by at least one of the one or more facilities can be increased, initiating operations to increase production of the resources by at least the one of the or more facilities, wherein additional amounts of the resources produced in response to the operations to increase the production are provided to the pipeline, and wherein the additional amounts of the resources are utilized by the liquefaction facility to produce the LNG and/or the LIN.

30. The method of claim 29 further comprising identifying one or more additional candidate locations in response to a determination that production of the resources by at least one of the one or more facilities cannot be increased, wherein each of the one or more additional candidate locations correspond to locations where the identified resources are accessible, and wherein facilities that provide the identified resources to the one or more additional candidate locations can increase production of the identified resources to produce additional amounts of the resources for use by the liquefaction facility to produce the LNG and/or LIN.

31. The method of claim 1 further comprising at least one of:

determining relationship information for each configuration of the liquefaction facility, wherein the relationship information is representative of relationships between components of the liquefaction facility for each configuration of the liquefaction facility, and wherein the relationship information is included in the report;

calculating resource utilizations for each configuration of the liquefaction facility;

ranking the configurations of the liquefaction facility according to a composite of one or more ranking parameters, wherein the report comprises at least one of the schematic drawings, the relationship information, the information representative of the resource utilizations, and the rankings; and providing an interactive graphical user interface configured to receive inputs from a user, wherein the inputs modify at least one configuration of the liquefaction facility.

32. The non-transitory computer-readable storage medium of claim 23, the operations further comprising identifying one or more additional candidate locations in response to a determination that production of the resources by at least one of the one or more facilities cannot be increased, wherein each of the one or more additional candidate locations correspond to locations where the identified resources are accessible, and wherein facilities that provide the identified resources to the one or more additional candidate locations can increase production of the identified resources to produce additional amounts of the resources for use by the liquefaction facility to produce the LNG and/or LIN.

* * * * *